(12) United States Patent
Wei et al.

(10) Patent No.: US 9,493,088 B2
(45) Date of Patent: Nov. 15, 2016

(54) ELECTRIC AUTOMOBILE AND INTEGRATED CONTROL SYSTEM THEREOF

(71) Applicants: SHENZHEN BYD AUTO R&D COMPANY LIMITED, Shenzhen (CN);
(Continued)

(72) Inventors: Wei Wei, Shenzhen (CN); Hongjun Wang, Shenzhen (CN); Wei Zhou, Shenzhen (CN)

(73) Assignees: SHENZHEN BYD AUTO R&D COMPANY LIMITED, Shenzhen, Guangdong (CN);
(Continued)

( * ) Notice: Subject to any disclaimer, the term of this patent is extended or adjusted under 35 U.S.C. 154(b) by 0 days.

(21) Appl. No.: 14/370,041

(22) PCT Filed: Dec. 31, 2012

(86) PCT No.: PCT/CN2012/088008
§ 371 (c)(1),
(2) Date: Jun. 30, 2014

(87) PCT Pub. No.: WO2013/097801
PCT Pub. Date: Jul. 4, 2013

(65) Prior Publication Data
US 2015/0006008 A1    Jan. 1, 2015

(30) Foreign Application Priority Data

Dec. 31, 2011  (CN) .......................... 2011 1 0458395
Dec. 31, 2011  (CN) ...................... 2011 2 0571932 U
(Continued)

(51) Int. Cl.
*B60L 11/18*  (2006.01)
*H02J 7/00*  (2006.01)
(Continued)

(52) U.S. Cl.
CPC ............ *B60L 11/1851* (2013.01); *B60L 1/003* (2013.01); *B60L 1/006* (2013.01); *B60L 3/003* (2013.01);
(Continued)

(58) Field of Classification Search
None
See application file for complete search history.

(56) References Cited

U.S. PATENT DOCUMENTS

| 4,920,475 | A | 4/1990 | Rippel |
| 5,471,655 | A | 11/1995 | Kivari |

(Continued)

FOREIGN PATENT DOCUMENTS

| CN | 1625014 A | 6/2005 |
| CN | 1634725 A | 7/2005 |

(Continued)

OTHER PUBLICATIONS

English language abstract for CN200947552Y extracted from espacenet.com on Jun. 30, 2015, 1 page.
(Continued)

*Primary Examiner* — John R Olszewski
*Assistant Examiner* — Gerrad A Foster
(74) *Attorney, Agent, or Firm* — Howard & Howard Attorneys PLLC

(57) ABSTRACT

An integrated control system for an electric vehicle, comprising: an integrated driving and charge-discharge controller connected with a power battery via a high-voltage distribution box, connected with a motor and a charge-discharge socket respectively, and configured to drive the
(Continued)

motor when the electric vehicle is in a driving mode and to control to charge and discharge the power battery via the charge-discharge socket when the electric vehicle is in a charge-discharge mode; an auxiliary high-voltage element connected with the power battery via the high-voltage distribution box; a first DC/DC module connected with the power battery via the high-voltage distribution box; and a controller connected with the high-voltage distribution box and configured to control the high-voltage distribution box so as to perform a pre-charging via the high-voltage distribution box before the integrated driving and charge-discharge controller, the auxiliary high-voltage element and the first DC/DC module are powered on.

16 Claims, 14 Drawing Sheets

(71) Applicants: BYD COMPANY LIMITED, Shenzhen (CN)

(73) Assignees: BYD COMPANY LIMITED, Shenzhen, Guangdong (CN)

(30) Foreign Application Priority Data

| Jun. 7, 2012 | (CN) | ......................... 2012 1 0185660 |
| Jun. 7, 2012 | (CN) | ..................... 2012 2 0266009 U |
| Jun. 27, 2012 | (CN) | ......................... 2012 1 0214502 |
| Jun. 27, 2012 | (CN) | ..................... 2012 2 0303636 U |

(51) Int. Cl.
  *H02J 7/02* (2016.01)
  *H04B 3/54* (2006.01)
  *B60L 3/00* (2006.01)
  *B60L 1/00* (2006.01)
  *H02J 3/32* (2006.01)
  *H02J 7/34* (2006.01)

(52) U.S. Cl.
  CPC ............ *B60L 3/0046* (2013.01); *B60L 3/0069* (2013.01); *B60L 11/18* (2013.01); *B60L 11/1803* (2013.01); *B60L 11/1805* (2013.01); *B60L 11/185* (2013.01); *B60L 11/1809* (2013.01); *B60L 11/1811* (2013.01); *B60L 11/1812* (2013.01); *B60L 11/1814* (2013.01); *B60L 11/1816* (2013.01); *B60L 11/1818* (2013.01); *B60L 11/1838* (2013.01); *B60L 11/1842* (2013.01); *B60L 11/1861* (2013.01); *B60L 11/1872* (2013.01); *H02J 3/32* (2013.01); *H02J 7/007* (2013.01); *H02J 7/0036* (2013.01); *H02J 7/0054* (2013.01); *H02J 7/0055* (2013.01); *H02J 7/0063* (2013.01); *H02J 7/0065* (2013.01); *H02J 7/0068* (2013.01); *H02J 7/02* (2013.01); *H02J 7/345* (2013.01); *H04B 3/542* (2013.01); *B60L 2210/12* (2013.01); *B60L 2210/14* (2013.01); *B60L 2210/30* (2013.01); *B60L 2210/40* (2013.01); *B60L 2210/42* (2013.01); *B60L 2230/12* (2013.01); *B60L 2240/527* (2013.01); *B60L 2240/529* (2013.01); *B60L 2240/545* (2013.01); *B60L 2240/547* (2013.01); *B60L 2240/549* (2013.01); *B60L 2250/12* (2013.01); *B60L 2260/22* (2013.01); *B60L 2260/26* (2013.01); *B60L 2270/147* (2013.01); *B60L 2270/20* (2013.01); *H02J 7/022* (2013.01); *H02J 2007/0067* (2013.01); *Y02E 60/721* (2013.01); *Y02T 10/705* (2013.01); *Y02T 10/7005* (2013.01); *Y02T 10/7044* (2013.01); *Y02T 10/7072* (2013.01); *Y02T 10/7088* (2013.01); *Y02T 10/7225* (2013.01); *Y02T 10/7233* (2013.01); *Y02T 10/7241* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| 5,642,270 | A | 6/1997 | Green et al. |
| 5,994,874 | A | 11/1999 | Hirose |
| 6,163,135 | A | 12/2000 | Nakayama et al. |
| 6,690,719 | B1 | 2/2004 | Raphaeli et al. |
| 7,411,362 | B2 | 8/2008 | Ishikawa |
| 7,489,106 | B1 | 2/2009 | Tikhonov |
| 8,427,103 | B2 | 4/2013 | Ohtomo |
| 8,487,582 | B2 | 7/2013 | King et al. |
| 8,922,050 | B2 | 12/2014 | Fassnacht |
| 2003/0197425 | A1 | 10/2003 | Montante |
| 2003/0220026 | A1 | 11/2003 | Oki et al. |
| 2004/0017175 | A1 | 1/2004 | Lee et al. |
| 2004/0026140 | A1* | 2/2004 | Suzuki ................... B60K 6/485 180/65.26 |
| 2004/0062059 | A1 | 4/2004 | Cheng et al. |
| 2004/0145338 | A1 | 7/2004 | Nakamura et al. |
| 2005/0182535 | A1 | 8/2005 | Huang |
| 2005/0231172 | A1 | 10/2005 | Kato et al. |
| 2006/0244411 | A1 | 11/2006 | Wobben |
| 2007/0075661 | A1 | 4/2007 | Hsu |
| 2008/0180058 | A1 | 7/2008 | Patel et al. |
| 2008/0185999 | A1 | 8/2008 | Matsukawa et al. |
| 2009/0066291 | A1 | 3/2009 | Tien et al. |
| 2009/0079389 | A1 | 3/2009 | Ohtomo |
| 2009/0096424 | A1 | 4/2009 | Ambrosio et al. |
| 2009/0184681 | A1 | 7/2009 | Kuno |
| 2009/0278405 | A1 | 11/2009 | Stancu et al. |
| 2009/0295224 | A1 | 12/2009 | Kobayashi |
| 2010/0007306 | A1 | 1/2010 | Fukui et al. |
| 2010/0027305 | A1 | 2/2010 | Oyobe et al. |
| 2010/0079004 | A1 | 4/2010 | Keefe |
| 2010/0091529 | A1 | 4/2010 | Jakeman et al. |
| 2010/0096918 | A1 | 4/2010 | Sawada et al. |
| 2010/0164287 | A1 | 7/2010 | Komazawa et al. |
| 2010/0181829 | A1 | 7/2010 | Ichikawa et al. |
| 2010/0214055 | A1 | 8/2010 | Fuji et al. |
| 2010/0219794 | A1 | 9/2010 | Sugimoto et al. |
| 2010/0244558 | A1* | 9/2010 | Mitsutani ............... B60K 6/365 307/9.1 |
| 2010/0253145 | A1 | 10/2010 | King et al. |
| 2011/0005037 | A1 | 1/2011 | Kim |
| 2011/0020174 | A1 | 1/2011 | Rauschnabel et al. |
| 2011/0040436 | A1 | 2/2011 | Yamamoto et al. |
| 2011/0050174 | A1 | 3/2011 | King et al. |
| 2011/0062962 | A1 | 3/2011 | Wolf et al. |
| 2011/0084664 | A1 | 4/2011 | White et al. |
| 2011/0115425 | A1 | 5/2011 | Olsson |
| 2011/0148353 | A1 | 6/2011 | King et al. |
| 2011/0193532 | A1 | 8/2011 | Iwanaga et al. |
| 2011/0202219 | A1 | 8/2011 | Ishibashi |
| 2012/0153717 | A1 | 6/2012 | Obayashi et al. |
| 2014/0354240 | A1 | 12/2014 | Wang et al. |

FOREIGN PATENT DOCUMENTS

| CN | 200947552 Y | 9/2007 |
| CN | 101388560 A | 3/2009 |
| CN | 201329816 Y | 10/2009 |
| CN | 102025182 A | 4/2010 |

(56) References Cited

FOREIGN PATENT DOCUMENTS

| | | |
|---|---|---|
| CN | 201594757 U | 9/2010 |
| CN | 201752075 U | 2/2011 |
| CN | 101997336 A | 3/2011 |
| CN | 201781330 U | 3/2011 |
| CN | 102045086 A | 5/2011 |
| CN | 102055226 A | 5/2011 |
| CN | 201839022 U | 5/2011 |
| CN | 201876820 U | 6/2011 |
| CN | 201877856 U | 6/2011 |
| CN | 102118184 A | 7/2011 |
| CN | 201898359 U | 7/2011 |
| CN | 102185343 A | 9/2011 |
| CN | 102185375 A | 9/2011 |
| CN | 102222928 A | 10/2011 |
| CN | 102416882 A | 4/2012 |
| CN | 202276163 U | 6/2012 |
| CN | 102673422 A | 9/2012 |
| CN | 202435108 U | 9/2012 |
| CN | 202455130 U | 9/2012 |
| CN | 102882249 A | 1/2013 |
| CN | 102904300 A | 1/2013 |
| EP | 0 985 570 A2 | 3/2000 |
| EP | 1 531 075 A1 | 5/2005 |
| EP | 2 020 726 A2 | 2/2009 |
| EP | 2 039 560 A1 | 3/2009 |
| EP | 2 290 778 A2 | 3/2011 |
| JP | H06141488 A | 5/1994 |
| JP | 2010 178431 A | 8/2010 |
| JP | 2010 252520 A | 11/2010 |
| JP | 2011 083124 A | 4/2011 |
| JP | 2011 176959 A | 9/2011 |
| JP | 2011 234470 A | 11/2011 |
| WO | WO 2010 079074 A1 | 7/2010 |
| WO | WO 2011 013388 A2 | 2/2011 |
| WO | WO 2013 097797 A1 | 7/2013 |
| WO | WO 2013 097801 A1 | 7/2013 |
| WO | WO 2013 097803 A1 | 7/2013 |
| WO | WO 2013 097825 A1 | 7/2013 |

OTHER PUBLICATIONS

English language abstract for CN201329816Y extracted from espacenet.com on Jun. 30, 2015, 1 page.

English language abstract for CN202455130U extracted from espacenet.com on Jun. 30, 2015, 1 page.

International Search Report of WO2013097801A1 dated Mar. 22, 2013, 3 pages.

Supplementary European Search Report for Application No. EP 12 86 1486 dated Nov. 17, 2015; 10 pages.

English language abstract and machine-assisted English language translation of CN 102055226 a extracted from www.espacenet.com on Jun. 3, 2016; 12 pages.

English language abstract and machine-assisted English language translation of CN 102416882 a extracted from www.espacenet.com on Jun. 3, 2016; 5 pages.

English language abstract and machine-assisted English language translation of CN 1201594757 U extracted from www.espacenet.com on Jun. 3, 2016; 8 pages.

English language abstract and machine-assisted English language translation of CN 201752075 U extracted from www.espacenet.com on Jun. 3, 2016; 11 pages.

English language abstract and machine-assisted English language translation of CN 202455130 U extracted from www.espacenet.com on Jun. 3, 2016; 13 pages.

English language abstract and machine-assisted English language translation of JP 2011-234470 a extracted from www.espacenet.com on Jun. 3, 2016; 15 pages.

English language abstract and machine-assisted English language translation of JP H06141488 A extracted from www.espacenet.com on Aug. 9, 2016; 8 pages.

English language abstract only of EP 0 985 570 A2 extracted from www.espacenet.com on Aug. 9, 2016; see English language equivalent U.S. Pat. No. 6,163,135 A; 2 pages.

English language abstract only of EP 1 531 075 A1 extracted from www.espacenet.com on Aug. 9, 2016; see English language equivalent U.S. Pat. No. 7,411,362 B2; 2 pages.

English language abstract only of CN 1625014 A extracted from www.espacenet.com on Jun. 30, 2015; 1 pages.

English language abstract only of CN 1634725 A extracted from www.espacenet.com on Aug. 10, 2016, 1 pages.

English language abstract and machine-assisted English language translation of EP 2 020 726 A2 extracted from www.espacenet.com on Aug. 9, 2016; 21 pages.

English language abstract only of CN 101388560 A extracted from www.espacenet.com on Jun. 30, 2015; 1 pages.

English language abstract only of EP 2 039 560 A1 extracted from www.espacenet.com on Aug. 9, 2016; see English language equivalent U.S. Pat. No. 8,427,103 B2; 1 pages.

English language abstract only of CN 102025182 A extracted from www.espacenet.com on Jun. 30, 2015; 1 pages.

English language abstract only of WO 2010/079074 A1 extracted from www.espacenet.com on Aug. 10, 2016; see English language equivalent U.S. Pat. No. 8,922,050 B2; 1 pages.

English language abstract and machine-assisted English language translation of JP 2010 178431 A extracted from www.espacenet.com on Aug. 9, 2016; 14 pages.

English language abstract and machine-assisted English language translation of JP 2010 252520 A extracted from www.espacenet.com on Aug. 9, 2016; 12 pages.

English language abstract only of EP 2 290 778 A2 extracted from www.espacenet.com on Aug. 10, 2016; see English language equivalent U.S. Pat. No. 8,487,582 B2; 2 pages.

English language abstract and machine-assisted English language translation of CN 101997336 A extracted from www.espacenet.com on Aug. 9, 2016; 10 pages.

English language abstract and machine-assisted English language translation of CN 201781330 U extracted from www.espacenet.com on Aug. 10, 2016; 8 pages.

English language abstract and machine-assisted English language translation of JP 2011 083124 A extracted from www.espacenet.com on Aug. 9, 2016; 9 pages.

English language abstract and machine-assisted English language translation of CN 102045086 A extracted from www.espacenet.com on Aug. 9, 2016; 5 pages.

English language abstract and machine-assisted English language translation of CN 201839022 U extracted from www.espacenet.com on Aug. 10, 2016; 7 pages.

English language abstract and machine-assisted English language translation of CN 201876820 U extracted from www.espacenet.com on Aug. 10, 2016; 4 pages.

English language abstract and machine-assisted English language translation of CN 201877856 U extracted from www.espacenet.com on Aug. 10, 2016; 8 pages.

English language abstract and machine-assisted English language translation of CN 102118184 A extracted from www.espacenet.com on Aug. 9, 2016; 7 pages.

English language abstract and machine-assisted English language translation of CN 201898359 U extracted from www.espacenet.com on Aug. 10, 2016; 4 pages.

English language abstract and machine-assisted English language translation of JP 2011 176959 A extracted from www.espacenet.com on Aug. 9, 2016; 12 pages.

English language abstract and machine-assisted English language translation of CN 102185343 A extracted from www.espacenet.com on Aug. 9, 2016; 8 pages English language abstract and machine-assisted English language translation of CN 102185375 A extracted from www.espacenet.com on Aug. 9, 2016; 10 pages.

English language abstract and machine-assisted English language translation of CN 102222928 A extracted from www.espacenet.com on Aug. 9, 2016; 12 pages.

English language abstract and machine-assisted English language translation of CN 202276163 U extracted from www.espacenet.com on Aug. 10, 2016; 8 pages.

English language abstract only of CN 202435108 U extracted from www.espacenet.com on Jun. 30, 2015; 1 pages.

(56) References Cited

OTHER PUBLICATIONS

English language abstract and machine-assisted English language translation of CN 102673422 a extracted from www.espacenet.com on Aug. 9, 2016; 10 pages.
English language abstract and machine-assisted English language translation of CN 102774284 a extracted from www.espacenet.com on Aug. 9, 2016; 15 pages.
English language abstract and machine-assisted English language translation of CN 102882249 a extracted from www.espacenet.com on Aug. 9, 2016; 12 pages.
English language abstract and machine-assisted English language translation of CN 102904300 a extracted from www.espacenet.com on Aug. 9, 2016; 12 pages.
International Search Report of WO 2013 097797 A1 dated Mar. 14, 2013; 2 pages.
International Search Report of WO 2013 097798 A1 dated Mar. 14, 2013; 2 pages.
International Search Report of WO 2013 097803 A1 dated Mar. 20, 2013; 3 pages.
International Search Report of WO 2013 097825 A1 dated Mar. 20, 2013; 3 pages.

* cited by examiner

ELECTRIC AUTOMOBILE AND INTEGRATED CONTROL SYSTEM THEREOF

CROSS-REFERENCE TO RELATED APPLICATION

This U.S. application claims priority under 35 U.S.C 371 to, and is a U.S. National Phase application of, the International Patent Application No. PCT/CN2012/088008, filed Dec. 31, 2012, which claims the benefit of prior Chinese Application No. 201110458395.6 filed Dec. 31, 2011, No. 201120571932.3 filed Dec. 31, 2011, No. 201210185660.2 filed Jun. 7, 2012, No. 201220266009.3 filed Jun. 7, 2012, No. 201220303636.X filed Jun. 27, 2012, and No. 201210214502.5 filed Jun. 27, 2012. The entire contents of the above-mentioned patent applications are incorporated by reference as part of the disclosure of this U.S. application.

FIELD

The present disclosure relates to an electric vehicle field, and more particularly to an electric vehicle and an integrated control system of the electric vehicle.

BACKGROUND

With the development of science and technology, fuel vehicles are being replaced by environment friendly and energy saving electric vehicles. However, the popularity of the electric vehicles encounters some problems, among which high driving mileage and fast charging technology has become major problems in the promotion of electric vehicles.

Currently, large-capacity batteries are used in most electric vehicles. However, although these batteries may enhance a battery life of the electric vehicle, they make a charging time too long. Although a specialized DC (direct current) charging station may charge a battery quickly, problems such as high cost and large occupied area make the popularity of such an infrastructure encounter a certain difficulty. Moreover, because of a limited space of the vehicle, an in-vehicle charger may not satisfy the requirement of a charging power due to the limitation of its volume.

A charging solution currently used in the market includes the following solutions.

Solution (1)

As shown in FIGS. 1-2, an in-vehicle charging-discharging device in this solution mainly includes a three-phase power transformer 1', a three-phase bridge circuit 2' consisting of six thyristor elements, a constant-voltage control device AUR, and a constant-current control device ACR. However, this solution causes a serious waste of space and cost.

Solution (2)

As shown in FIG. 3, an in-vehicle charging-discharging device in this solution includes two charging sockets 15', 16' to adapt to the single-phase/three-phase charging, which increases the cost. A motor driving loop includes a filtering module consisting of an inductor L1' and a capacitor C1'. When a motor is driven, a loss of a three-phase current is generated when it flows through the filtering module, which causes a waste of an electric quantity of a battery. With this solution, during the charging-discharging operation, an inverter 13' rectifies/inverts an AC (alternating current), and the voltage after the rectifying/inverting may not be adjusted, such that a battery operation voltage range is narrow.

Therefore, most AC charging technologies currently used in the market are a single-phase charging technology, which has disadvantages of low charging power, long charging time, large hardware volume, single function, restriction by voltage levels of different regional grids, etc.

As key components of the electric vehicle, a motor drive system and a charging system of the power battery have a rapid technology progress. The motor drive system in the conventional electric vehicle acts as an independent system and has independent power conversion module and control module, as long as it ensures the motor drive requirement and a part of the vehicle requirements when the vehicle is running. The charging system of the power battery generally includes an in-vehicle AC charging system and a rapid DC charging system. The in-vehicle AC charging system has the power conversion module and the control module, and can charge the power battery with a small power. The rapid DC charging system only requires a corresponding distribution circuit and a battery management system at the vehicle side to perform an auxiliary control, but the charging apparatus needs large devices such as the power conversion module. For the electric vehicle provided with power battery having relatively larger power, in order to ensure the convenience and rapidness of the charging, both of these two charging systems are needed to provide. Currently, with the development of technology and the urgent requirement of reducing cost, the motor drive system, the charging system, and even the inverter system configured to discharge externally are developed towards integration and unification gradually. The integration includes the integral formation of the common control module and the power modifying module.

However, since this integrated system has many functions, a complexity of the system is increased greatly, and its cooperation with other systems in the vehicle faces severe challenges. In addition, accompanying problems such as mutual interference, a function switching safety and a heat dissipation requirement may occur. Thus, conventional independent processing mode cannot satisfy the requirements.

SUMMARY

Embodiments of the present disclosure seek to solve at least one of the problems existing in the related art to at least some extent.

Accordingly, a first object of the present disclosure is to provide an integrated control system for an electric vehicle, which may avoid interruptions and have a high safety.

A second object of the present disclosure is to provide an electric vehicle.

In order to achieve the above objects, embodiments of a first aspect of the present disclosure provide an integrated control system for an electric vehicle. The integrated control system includes: a power battery; a high-voltage distribution box connected with the power battery; an integrated driving and charge-discharge controller, connected with the power battery via the high-voltage distribution box, and connected with a motor and a charge-discharge socket respectively, and configured to drive the motor when the electric vehicle is in a driving mode, and to control to charge and discharge the power battery via the charge-discharge socket when the electric vehicle is in a charge-discharge mode; an auxiliary high-voltage element connected with the power battery via the high-voltage distribution box; a first DC/DC module connected with the power battery via the high-voltage distribution box; and a controller connected with the high-voltage distribution box and configured to control the high-voltage distribution box so as to perform a pre-charging via the high-voltage distribution box before the integrated driving and charge-discharge controller, the auxiliary high-voltage element and the first DC/DC module are powered on.

With the integrated control system for the electric vehicle according to embodiments of the present disclosure, a unified switching between respective operation modes of the system can be implemented according to practical requirements of different operation modes, thus implementing a coordination control to separated systems in the vehicle and having a high compatibility. Moreover, by providing a cooling system, a heat dissipation requirement can be satisfied when the system works at a high power, thus satisfying different functional requirements, expanding requirement of the electric vehicle, and having a good adaptability. The system implements the compatibility for the driving, charging and discharging requirements and satisfies the requirement of high power output.

Moreover, embodiments of a second aspect of the present disclosure provide an electric vehicle including the above mentioned integrated control system.

With the electric vehicle according to embodiments of the present disclosure, a unified switching between respective operation modes of the system can be implemented according to practical requirements of different operation modes, thus implementing a coordination control to separated systems in the vehicle and having a high compatibility. Moreover, by providing a cooling system, a heat dissipation requirement can be satisfied when the system works at a high power, thus satisfying different function requirements, expanding requirement of the electric vehicle, and having a good adaptability. The system implements the compatibility for the driving, charging and discharging requirements and satisfies the requirement of high power output.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
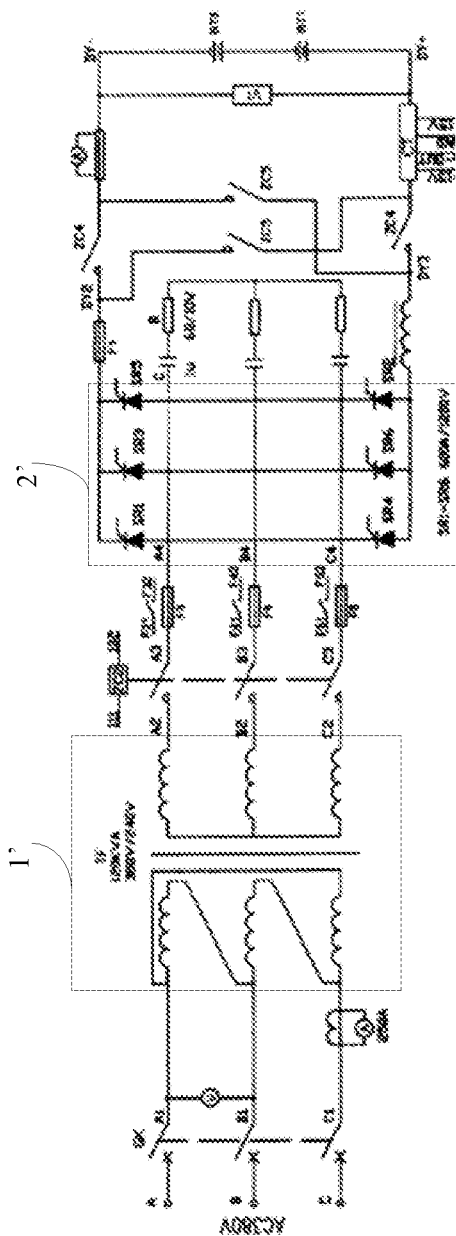
FIG. 1 is a circuit diagram of a conventional in-vehicle charge-discharge device.
Figure 2:
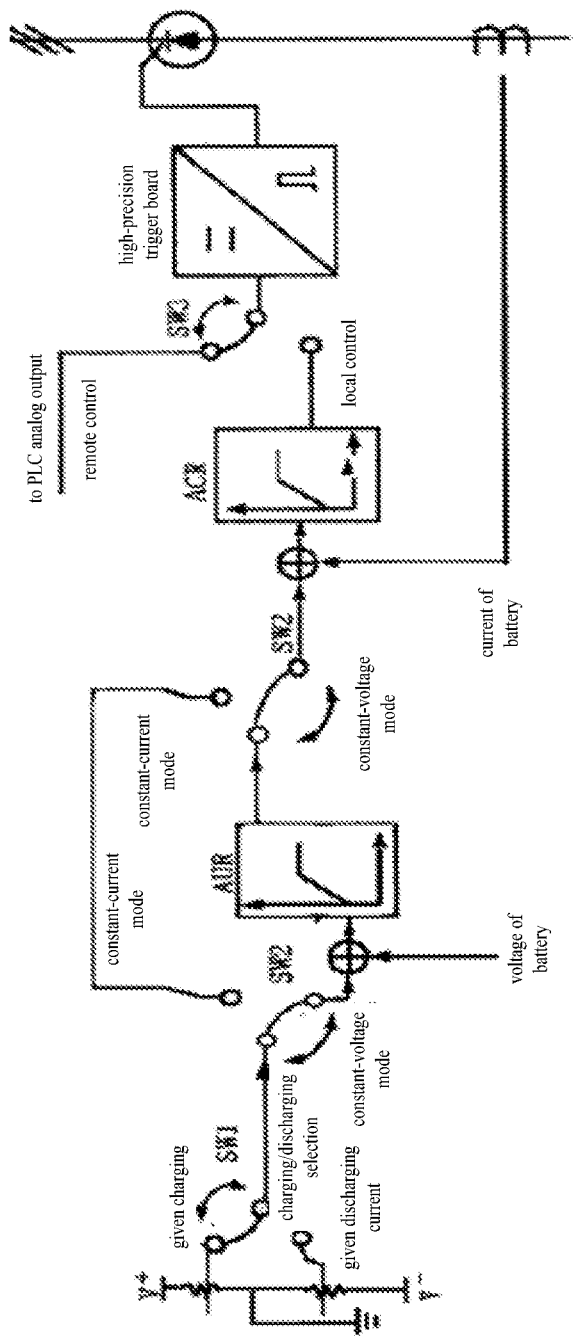
FIG. 2 is a schematic diagram of controlling a conventional in-vehicle charge-discharge device.
Figure 3:
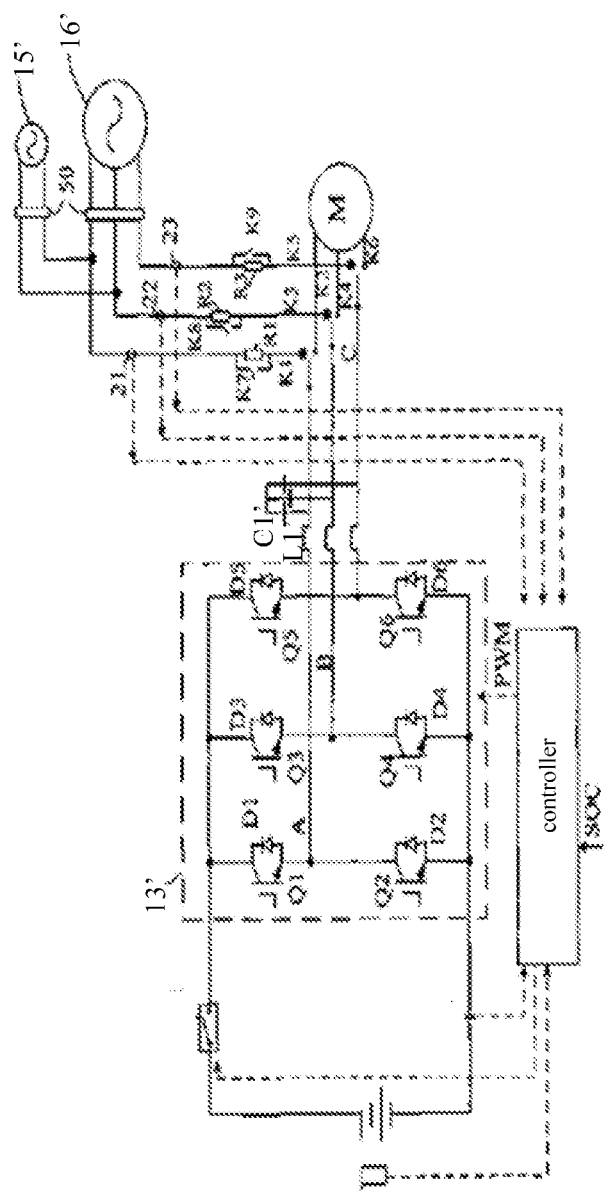
FIG. 3 is a circuit diagram of another conventional in-vehicle charge-discharge device.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the particular embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Figure 4:
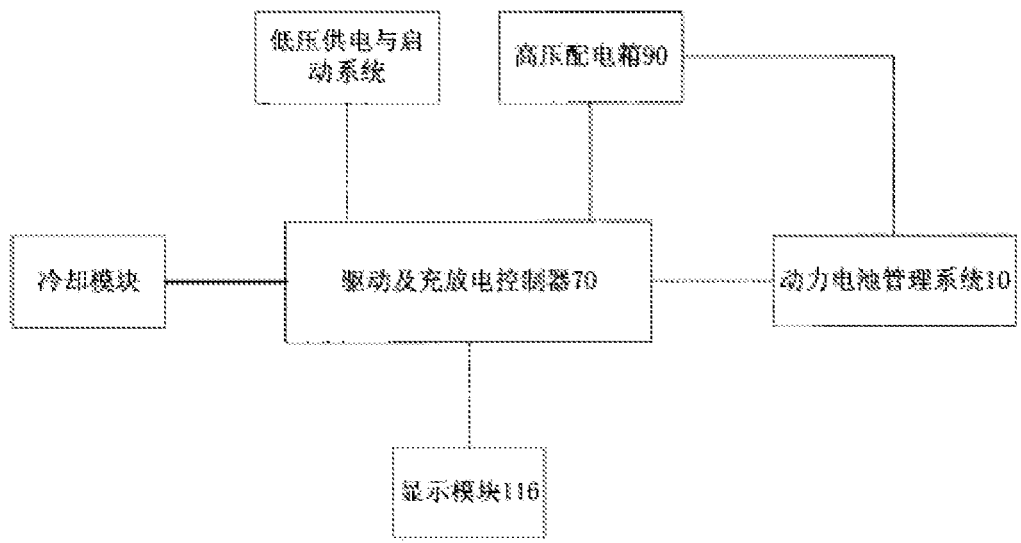
FIG. 4 is a schematic diagram of an integrated driving and charge-discharge control system according to an embodiment of the present disclosure.
Figure 5:
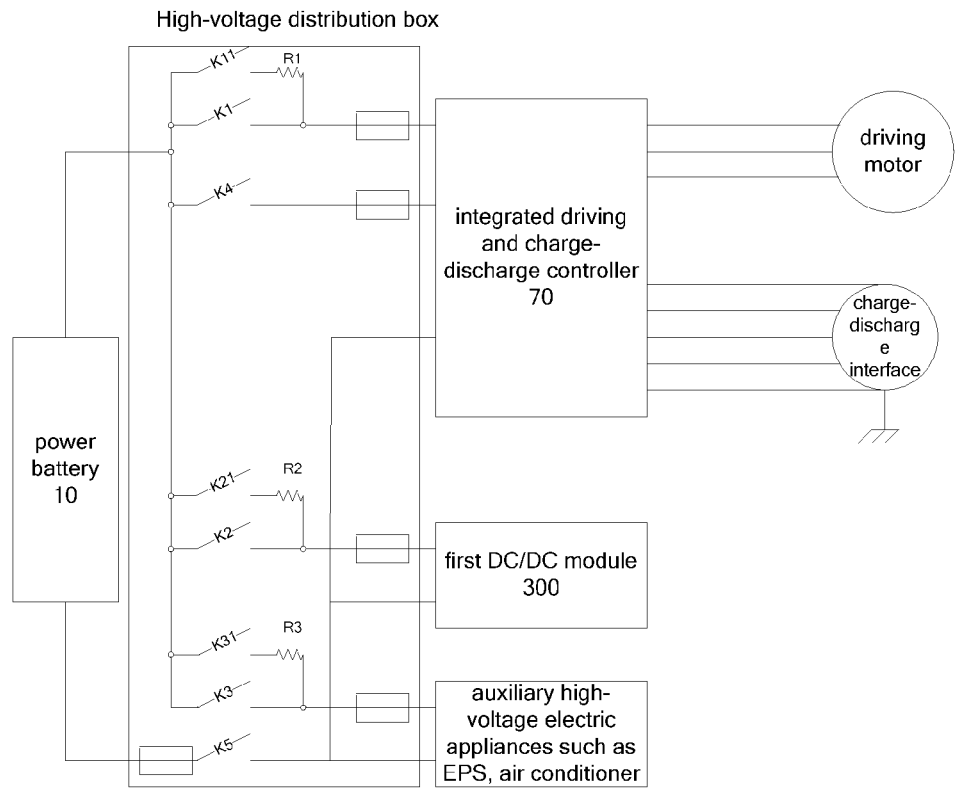
FIG. 5 is a schematic diagram of a high-voltage distribution box in an integrated control system.
Figure 6:
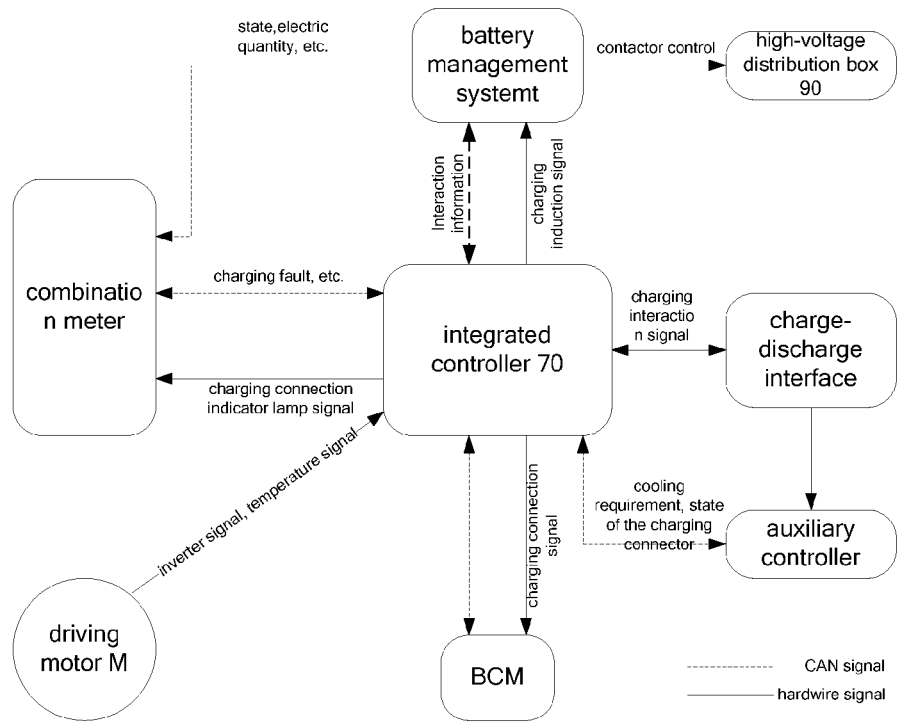
FIG. 6 is a schematic diagram showing a working principle of an integrated control system.

As shown in FIGS. 4-6, an integrated control system for an electric vehicle according to an embodiment of the present disclosure includes a power battery 10, a high-voltage distribution box 90, an auxiliary high-voltage element, a first DC/DC module 300, an integrated driving and charge-discharge controller 70 and a controller 80. The high-voltage distribution box 90 is connected with the power battery 10. The integrated driving and charge-discharge controller 70 is connected with the power battery 10 via the high-voltage distribution box 90, and connected with a motor and a charge-discharge socket, respectively. The integrated driving and charge-discharge controller 70 is configured to drive the motor when the electric vehicle is in a driving mode, and to control to charge and discharge the power battery via the charge-discharge socket when the electric vehicle is in a charge-discharge mode.

The auxiliary high-voltage element is connected with the power battery 10 via the high-voltage distribution box 90. The first DC/DC module 300 is connected with the power battery 10 via the high-voltage distribution box 90. The controller 80 is connected with the high-voltage distribution box 90, and configured to control the high-voltage distribution box 90 so as to perform a pre-charging via the high-voltage distribution box 90 before the integrated driving and charge-discharge controller 70, the auxiliary high-voltage element and the first DC/DC module are powered on.

The high-voltage distribution box 90 includes: a first pre-charging control module and a first switch connected in parallel with the first pre-charging control module, in which the pre-charging control module has a first terminal connected with a first terminal of the power battery and a second terminal connected with a first terminal of the integrated driving and charge-discharge controller, and the first switch K1 has a first terminal connected with the first terminal of the power battery and a second terminal connected with the first terminal of the integrated driving and charge-discharge controller; a second pre-charging control module and a second switch K2 connected in parallel with the second pre-charging control module, which the second pre-charging control module has a first terminal connected with the first terminal of the power battery and a second terminal connected with a first terminal of the DC/DC module 300, and the second switch K2 has a first terminal connected with the first terminal of the power battery and a second terminal connected with the first terminal of the first DC/DC module; a third pre-charging control module and a third switch K3 connected in parallel with the third pre-charging control module, in which the third pre-charging control module has a first terminal connected with the first terminal of the power battery and a terminal connected with a first terminal of the auxiliary high-voltage element, and the third switch K3 has a first terminal connected with the first terminal of the power battery and a second terminal connected with the first terminal of the auxiliary high-voltage element; a fourth switch K4* having a first terminal connected with the first terminal of the power battery and a second terminal connected with a second terminal the integrated driving and charge-discharge controller, and a fifth switch having a first terminal connected with the first terminal of the power battery and a second terminal connected with a third terminal of the integrated driving and charge-discharge controller, a second terminal of the first DC/DC module and a second terminal of the auxiliary high-voltage element respectively.

In FIG. 5, three pre-charging resistors are used together with the switches K11, K21 and K31 in the pre-charging circuit. According to the actual conditions, if the requirement to the pre-charging time is low and the requirement to the cost and structure is high, these three pre-charging resistors can be merged into one pre-charging resistor, which implements the same function by setting different pre-charging time and dead-time with the power battery management system software.

When the electric vehicle is in the driving mode or the charge-discharge mode, the controller controls to pre-charge the integrated driving and charge-discharge controller via the first pre-charging control module and turns on the fourth switch K4; when a bus voltage of the integrated driving and charge-discharge controller is a predetermined multiple of a voltage of the power battery, the controller controls the first pre-charging control module to turn off and turns on the first switch.

After the first switch K1 is turned on, the controller further controls to pre-charge the auxiliary high-voltage element via the third pre-charging control module; and when a bus voltage of the auxiliary high-voltage element is a predetermined multiple of the voltage of the power battery, the controller controls the third pre-charging control module to turn off and turns on the third switch K3.

When the electric vehicle is in the driving mode and the third switch K3 is turned on, the controller further controls to pre-charge the first DC/DC module 300 via the second pre-charging control module; and when a bus voltage of the first DC/DC module 300 is a predetermined multiple of the voltage of the power battery 10, the controller controls the second pre-charging control module to turn off and turns on the second switch K2.

A working principle of the high-voltage distribution box will be described in detail with reference to FIG. 5.

Driving mode: a vehicle starting system sends a starting instruction, the power battery management system 10 controls the high-voltage distribution system to execute corresponding operations after detecting that a status of the power battery is good. The contactor K5 at a cathode of the power battery is first turned on, and then the main pre-charging contactor K11 is turned on, so as to pre-charge the driving and charge-discharge controller. The integrated driving and charge-discharge controller detects the power bus voltage and gives a feedback to the power battery management system. When the power battery management system detects that the bus voltage of the integrated driving and charge-discharge controller reaches 90% of the voltage of the power battery (or a difference between the bus voltage of the integrated driving and charge-discharge controller and the voltage of the power battery is less than 50V), it determines that the pre-charging is completed, controls the main contactor K1 to turn on, controls the main pre-charging contactor K11 to turn off, and sends states of the contactors and an instruction indicating that the pre-charging is completed and the driving is allowed. After receiving the above states and instruction and determining that the bus voltage is within a normal working voltage range, the driving and charge-discharge controller drives the vehicle according to signals such as a throttle depth signal. Subsequently, the power battery management system controls the auxiliary pre-charging contactor K31 to turn on, so as to pre-charge devices such as EPS controller and air compressor controller. These devices such as EPS controller detect and feed back the bus voltage thereof to the power battery management system. When the power battery management system detects that the bus voltage reaches 90% of the voltage of the power battery (or a difference between the bus voltage and the voltage of the power battery is less than 50V), it determines that the pre-charging is completed, controls the auxiliary contactor K3 to turn on, controls the auxiliary pre-charging contactor K31 to turn off, and sends states of corresponding contactors and an instruction indicating that the pre-charging is completed. Thus, the pre-charging of the auxiliary power circuit is completed. Subsequently, the power battery management system controls the DC pre-charging contactor K21 to turn on, so as to pre-charge the DC/DC inverter. The DC/DC inverter detects and feeds back the bus voltage thereof to the power battery management system. When the power battery management system detects that the bus voltage of the DC/DC inverter reaches 90% of the voltage of the power battery (or a difference between the bus voltage of the DC/DC inverter and the voltage of the power battery is less than 50V), it determines that the pre-charging is completed, controls the DC contactor K2 to turn on, controls the DC pre-charging contactor K21 to turn off, and sends states of corresponding contactors and an instruction indicating that the pre-charging is completed. Thus, the high-voltage distribution system completes the power distribution.

Charge-discharge mode: first, the driving and charge-discharge controller enters the charge-discharge mode according to corresponding vehicle settings or connecting the vehicle with the charging gun, and sends a message indicating that the charge or discharge is prepared. The power battery management system detects whether the state of the power battery is suitable for the charge or discharge after receiving the message, and if yes, starts to perform the pre-charging. The contactor K5 at a cathode of the power battery is first turned on, and then the main pre-charging contactor K11 is turned on, so as to pre-charge the driving and charge-discharge controller. The driving and charge-discharge controller detects and feeds back the power bus voltage to the power battery management system. When the power battery management system detects that the bus voltage of the driving and charge-discharge controller reaches 90% of the voltage of the power battery (or a difference between the bus voltage of the driving and charge-discharge controller and the voltage of the power battery is less than 50V), it determines that the pre-charging is completed, controls the main contactor K1 to turn on, controls the main pre-charging contactor K11 to turn off, and sends states of corresponding contactors and an instruction indicating that the pre-charging is completed and the charge-discharge is allowed. Subsequently, the power battery management system controls the DC pre-charging contactor K21 to turn on, so as to pre-charge the DC/DC inverter. The DC/DC inverter detects and feeds back the bus voltage thereof to the power battery management system. When the power battery management system detects that the bus voltage of the DC/DC inverter reaches 90% of the voltage of the power battery (or a difference between the bus voltage of the DC/DC inverter and the voltage of the power battery is less than 50V), it determines that the pre-charging is completed, controls the DC contactor K2 to turn on, controls the DC pre-charging contactor K21 to turn off, and sends states of corresponding contactors and the instruction indicating that the pre-charging is completed. Thus, the high-voltage distribution system completes the power distribution.

The integrated control system for the electric vehicle according to an embodiment of the present disclosure may further include a cooling module. The cooling module is configured to cool the integrated control system.

In the following, the integrated control system for the electric vehicle according to embodiments of the present disclosure will be described in detail.

In the driving mode, the BCM guards security of the whole vehicle and starts the starting system for low-voltage system to send starting-related instructions to related modules such as the power battery management system and the integrated driving and charge-discharge controller 70. The power battery management system enters the driving mode after receiving the starting instruction, and turns on the cathode contactor K5 and the pre-charging contactors such as K11, K21 and K31 in FIG. 5 after detecting that the state of the power battery is good, so as to start to pre-charge respective high-voltage electric appliances (such as the integrated driving and charge-discharge controller 70, the DC-DC 30, the air conditioner, and EPS) and to send corresponding voltages of the high-voltage circuits. When the power battery management system determines that the voltage of each high-voltage electric appliance satisfies the pre-charging completion condition, it controls corresponding contactors to turn on so as to switch on the high-voltage power circuits. DC-DC 30 inverts the high-voltage DC of the power battery into low-voltage current for supplying to low-voltage electric appliances and the storage battery in the vehicle. Meanwhile, the auxiliary controller samples vehicle signals and controls the cooling system to work. The driving and charge-discharge controller synthetically processes the vehicle signals sampled by the auxiliary controller, such as an accelerator pedal signal, a brake pedal signal and a gear signal, to compute corresponding desired torque value of the motor, so as to control the motor to drive the vehicle by inverting DC into AC. A display system such as a combination meter displays a running state of the vehicle.

In the charging mode, when the charging gun is connected to the charging connector of the vehicle, the integrated driving and charge-discharge controller 70 detects the connection between the charging gun and the vehicle, outputs corresponding connection signal to the BCM, the BCM controls to start the low-voltage charging system, and sends corresponding state. The power battery management system enters the charging mode according to the state instructed by the BCM, and implements corresponding operations according to state of the driving and charge-discharge controller after detecting that the state of the power battery is good. The driving and charge-discharge controller determines whether the charging connection is completed by detecting an interaction between the charging gun and the charging apparatus, sends the corresponding state signal to the power battery management system after determining that the charging connection is completed. After receiving the corresponding state signal, the power battery management system starts to turn on the pre-charging contactors K11 and K21 and the cathode contactor K5 in FIG. 5 to perform the pre-charging. Corresponding integrated driving and charge-discharge controller 70 and DC-DC 30 starts to send voltage values of the power circuits. When the power battery management system determines that voltage values of respective high-voltage electric appliances satisfy the pre-charging completion condition, it controls corresponding contactors to turn on to switch on the high-voltage power circuits, and sends corresponding state information. DC-DC 30 inverts the high-voltage DC of the power battery into the low-voltage current for supplying to low-voltage electric appliances and the storage battery in the vehicle. The driving and charge-discharge controller starts the power module after detecting that the high-voltage power circuit is connected and the voltages thereof are normal, the auxiliary controller detects the state of the charging interface and controls the cooling system to work, and the combination meter of the display system displays charging information of the vehicle. In the discharging mode, after the BCM controls the low-voltage system in the vehicle to start, a discharging instruction is sent by the combination meter or other trigger signals. The power battery management system enters the discharging mode according to the instruction, and turns on the pre-charging contactors K11, K21 and the cathode contactor K5 in FIG. 5 to perform the pre-charging after detecting that the state of the power battery is good. Corresponding integrated driving and charge-discharge controller 70 and DC-DC 30 start to send voltage values of the power circuits. When the power battery management system determines that voltage values of respective high-voltage electric appliances satisfy the pre-charging completion condition, it controls corresponding contactors to turn on to switch on the high-voltage power circuits, and sends corresponding state information. DC-DC 30 inverts the high-voltage DC of the power battery into the low-voltage current for supplying to low-voltage electric appliances and the storage battery in the vehicle. The driving and charge-discharge controller detects the connection state between the discharging connector and the charging gun, and starts to discharge externally according to set discharging requirements after detecting that the connection between the power circuit and the discharging apparatus is completed. The combination meter displays the discharging information of the vehicle.

Figure 7:
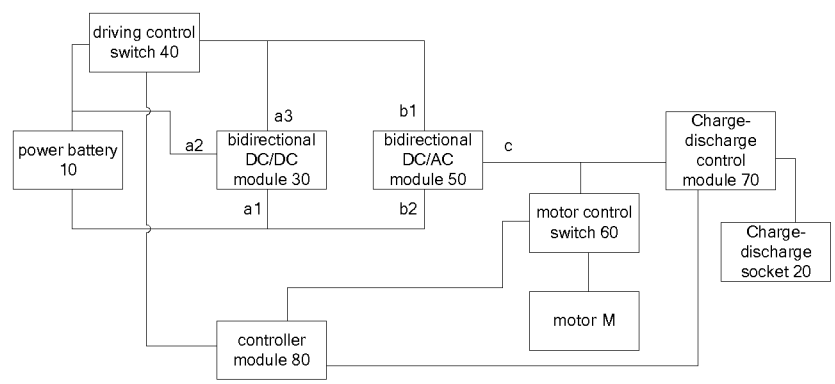
FIG. 7 is a block diagram of a power system for an electric vehicle according to an embodiment of the present disclosure.

As shown in FIG. 7, a power system for an electric vehicle according to an embodiment of the present disclosure includes a power battery 10, a charge-discharge socket 20, a bidirectional DC/DC module 30, a driving control switch 40, a bidirectional DC/AC module 50, a motor control switch 60, a charge-discharge control module 70 and a controller module 80.

The bidirectional DC/DC module 30 has a first DC terminal a1 connected with a first terminal of the power battery 10 and a second DC terminal a2 connected with a second terminal of the power battery 10. The first DC terminal a1 is a common DC terminal for an input to and an output from the bidirectional DC/DC module 30. The driving control switch 40 has a first terminal connected with the second terminal of the power battery 10 and a second terminal connected with a third DC terminal a3 of the bidirectional DC/DC module 30. In one embodiment, the driving control switch is the same as the switch K4 in FIG. 5. The bidirectional DC/AC module 50 has a first DC terminal b1 connected with the second terminal of the driving control switch 40 and a second DC terminal b2 connected with the first terminal of the power battery 10. The motor control switch 60 has a first terminal connected with an AC terminal c of the bidirectional DC/AC module 50 and a second terminal connected with a motor M. The charge-discharge control module 70 has a first terminal connected with the AC terminal c of the bidirectional DC/AC module 50 and a second terminal connected with the charge-discharge socket 20. The controller module 80 is connected with the driving control switch 40, the motor control switch 60 and the charge-discharge control module 70 respectively, and configured to control the driving control switch 40, the motor control switch 60 and the charge-discharge control module 70 according to a current operation mode of the power system.

Further, in some embodiments, the current operation mode of the power system may include a driving mode and a charge-discharge mode. When the current operation mode of the power system is the driving mode, the controller module 80 controls the driving control switch 40 to turn on to stop the bidirectional DC/DC module 30, controls the motor control switch 60 to turn on to drive the motor M normally, and controls the charge-discharge control module to turn off. It should be noted that, although in some embodiments, the motor control switch 60 in FIG. 5 includes three switches connected with a three-phase input to the motor, in other embodiments, the motor control switch 60 may also comprise two switches connected with a two-phase input to the motor, or even one switch, as long as the control on the motor may be realized. Therefore, other embodiments will not be described in detail herein.

When the current operation mode of the power system is the charge-discharge mode, the controller module 80 controls the driving control switch 40 to turn off to start the bidirectional DC/DC module 30, controls the motor control switch 60 to turn off to remove the motor M, and controls the charge-discharge control module to turn on, such that an external power source may charge the power battery 10 normally. The first DC terminal a1 and the third DC terminal a3 of the bidirectional DC/DC module 30 are connected with a positive terminal and a negative terminal of a DC bus respectively.

Figure 8:
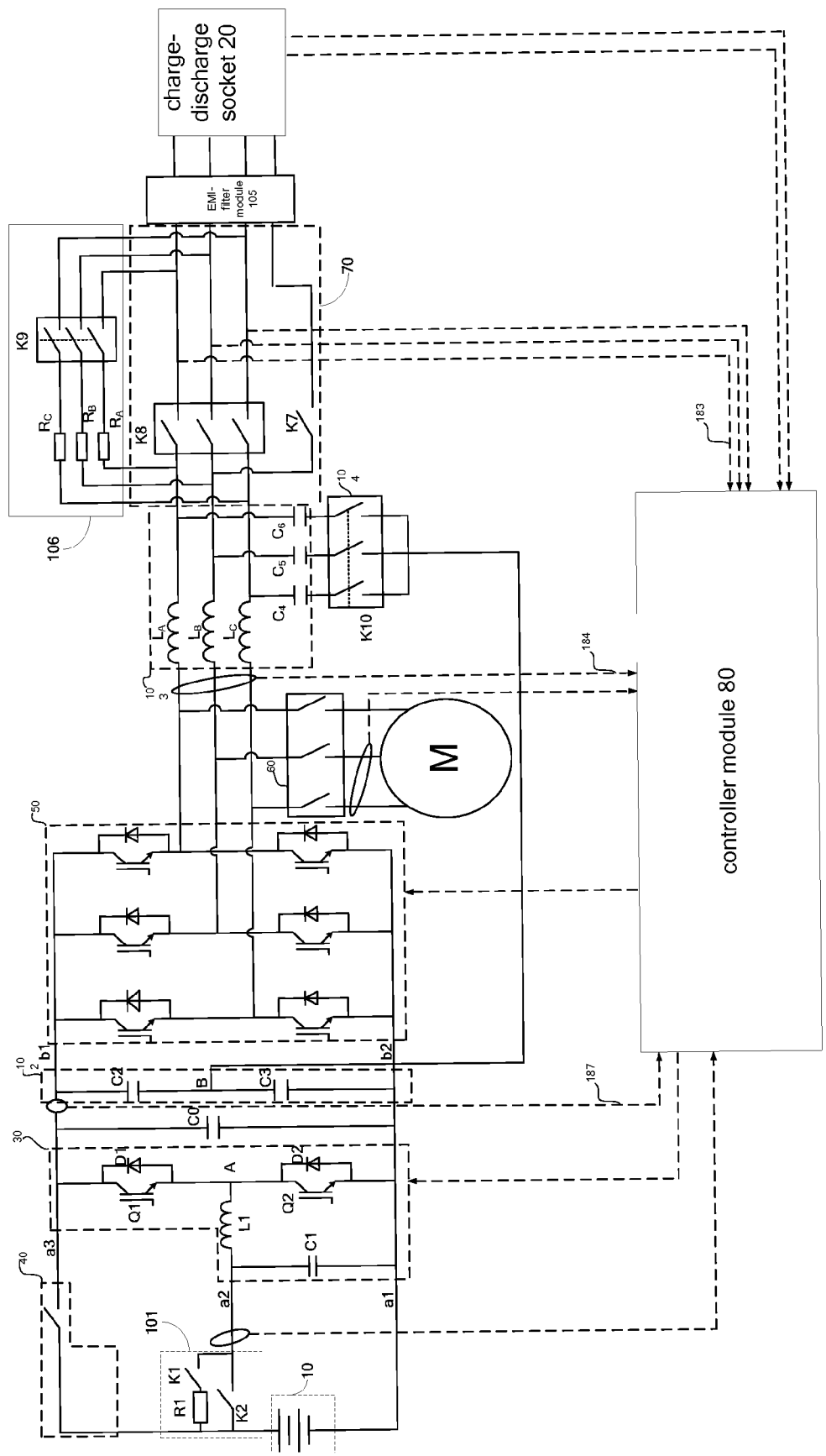
FIG. 8 is a topological diagram of a power system for an electric vehicle according to an embodiment of the present disclosure.

In one embodiment, as shown in FIG. 8, the power system for the electric vehicle further includes a first pre-charging control module 101. The first pre-charging control module 101 has a first terminal connected with the second terminal of the power battery 10 and a second terminal connected with the second DC terminal a2 of the bidirectional DC/DC module 30, and configured to pre-charge a capacitor C1 in the bidirectional DC/DC module 30 and a bus capacitor C0 connected between the first DC terminal a1 and the third DC terminal a3 of the bidirectional DC/DC module 30. The first pre-charging control module 101 includes a first switch K1, a first resistor R1 and a second switch K2. In one embodiment, the first switch K1 is the same as the switch K11 in FIG. 5, and the second switch K2 is the same as the switch K1 in FIG. 5. The first switch K1 has a first terminal connected with the second DC terminal a2 of the bidirectional DC/DC module 30. The first resistor R1 has a first terminal connected with a second terminal of the first switch K1 and a second terminal connected with the second terminal of the power battery 10. The second switch K2 is connected in parallel with the first resistor R1 and the first switch K1 which are connected in series. When the power system starts, the controller module 80 controls the first switch K1 to turn on to pre-charge the capacitor C1 in the bidirectional DC/DC module 30 and the bus capacitor C0;

and when a voltage across the bus capacitor C0 is a predetermined multiple of a voltage of the power battery 10, the controller module 80 controls the first switch K1 to turn off and controls the second switch K2 to turn on.

As shown in FIG. 8, the bidirectional DC/DC module 30 includes a first switching transistor Q1, a second switching transistor Q2, a first diode D1, a second diode D2, a first inductor L1 and a first capacitor C1. The first switching transistor Q1 and the second switching transistor Q2 are connected in series, and connected between the first DC terminal a1 and the third DC terminal a3 of the bidirectional DC/DC module 30, and controlled by the controller module 80. A first node A is defined between the first switching transistor Q1 and the second switching transistor Q2. The first diode D1 is connected with the first switching transistor Q1 in inverse-parallel. The second diode D2 is connected with the second switching transistor Q2 in inverse-parallel. The first inductor L1 has a first terminal connected with the first node A and a second terminal connected with the second terminal of the power battery 10. The first capacitor C1 has a first terminal connected with the second terminal of the first inductor L1 and a second terminal connected with the first terminal of the power battery 10.

Moreover, in some embodiments, as shown in FIG. 8, the power system for the electric vehicle further includes a leakage current reducing module 102. The leakage current module 102 is connected between the first DC terminal a1 and the third DC terminal a3 of bidirectional DC/DC module 30. Specifically, the leakage current reducing module 102 includes a second capacitor C2 and a third capacitor C3. The second capacitor C2 has a first terminal connected with a first terminal of the third capacitor C3 and a second terminal connected with the third DC terminal a3 of the bidirectional DC/DC module 30, the third capacitor C3 has a second terminal connected with the first DC terminal a1 of the bidirectional DC/DC module 30, and a second node B is defined between the capacitor C2 and the third capacitor C3.

Generally, a leakage current is large in an inverter and grid system without transformer isolation. Therefore, with the power system according to embodiments of the present disclosure, the leakage current reducing module 102 is connected between the positive terminal and the negative terminal of the DC bus, thus reducing the leakage current effectively. The leakage current reducing module 102 includes two capacitors C2 and C3 of the same type, the capacitor C2 is connected between the negative terminal of the DC bus and a three-phase AC neutral point potential, the capacitor C3 is connected between the positive terminal of the DC bus and the three-phase AC neutral point potential, and a high-frequency current may be fed back to a DC side when the power system operates, thus effectively reducing a high-frequency leakage current generated when the power system operates.

In one embodiment, as shown in FIG. 8, the power system for the electric vehicle further includes a filtering module 103, a filtering control module 104, an EMI-filter module 105 and a second pre-charging control module 106.

The filtering module 103 is connected between the bidirectional DC/AC module 50 and the charge-discharge control module 70. Specifically, the filtering module 103 includes inductors $L_A$, $L_B$, $L_C$ and capacitors C4, C5, C6, and the bidirectional DC/AC module 50 may comprise six IGBTs (insulated gate bipolar transistor), a connection point between an upper IGBT and a lower IGBT is connected with the filtering module 103 and the motor control switch 60 via a power bus respectively.

As shown in FIG. 8, the filtering control module 104 is connected between the second node B and the filtering module 103, and controlled by the controller module 80. When the current operation mode of the power system is the driving mode, the controller module 80 controls the filtering control module 104 to turn off. The filtering control module 104 may be a contactor relay, and consists of a contactor K10. The EMI-filter module 105 is connected between the charge-discharge socket 20 and the charge-discharge control module 70. It should be noted that, the position of the contactor K10 in FIG. 8 is merely exemplary. In other embodiments, the contactor K10 may be located at other positions, provided that the filtering module 103 may be turned off using the contactor K10. For example, in another embodiment, the contactor K10 may also be connected between the bidirectional DC/AC module 50 and the filtering module 103.

The second pre-charging control module 106 is connected with the charge-discharge control module 70 in parallel and configured to pre-charge capacitors C4, C5, C6 in the filtering module 103. The second pre-charging control module 106 includes three resistors $R_A$, $R_B$, $R_C$ and a three-phase pre-charging switch K9.

In one embodiment, as shown in FIG. 8, the charge-discharge control module 70 includes a three-phase switch K8 and/or a single-phase switch K7 configured to implement a three-phase charge-discharge or a single-phase charge-discharge.

In other words, in some embodiments, when the power system starts, the controller module 80 controls the first switch K1 to turn on to pre-charge the first capacitor C1 in the bidirectional DC/DC module 30 and the bus capacitor C0; and when the voltage across the bus capacitor C0 is a predetermined multiple of the voltage of the power battery 10, the controller module 80 controls the first switch K1 to turn off and controls the second switch K2 to turn on. In this way, the bidirectional DC/DC module 30 and the large-capacity bus capacitor C0 directly connected between power buses (i.e. DC buses) constitute main components for implementing a battery activation technology at a low temperature, and are configured to transfer the electric energy of the power battery 10 to the large-capacity bus capacitor C0 via the bidirectional DC/DC module 30, and to transfer the electric energy stored in the large-capacity bus capacitor C0 to the power battery 10 via the bidirectional DC/DC module 30 (i.e. charge the power battery 10). Therefore, the circulating charge and discharge of the power battery 10 makes the temperature of the power battery 10 rise to an optimum operation temperature range.

When the current operation mode of the power system is the driving mode, the controller module 80 controls the driving control switch 40 to turn on to stop the bidirectional DC/DC module 30, controls the motor control switch 60 to turn on to drive the motor M normally, and controls the charge-discharge control module 70 to turn off. In this way, a DC from the power battery 10 is inverted into an AC by means of the bidirectional DC/AC module 50, and the AC is transmitted to the motor M. The motor M can be controlled by a revolving transformer decoder technology and a space vector pulse width modulation (SVPWM) control algorithm.

When the current operation mode of the power system is the charge-discharge mode, the controller module 80 controls the driving control switch 40 to turn off to start the bidirectional DC/DC module 30, controls the motor control switch 60 to turn off to remove the motor M, and controls the charge-discharge control module 70 to turn on, such that an external power source such as a three-phase power source or a single-phase power source may charge the power battery 10 via the charge-discharge socket 20 normally. In other words, by detecting a charge connection signal, a type of an AC grid and relevant information on whole vehicle battery management, a controllable rectification function may be performed with aid of the bidirectional DC/AC module 50, and the in-vehicle power battery 10 may be charged by the single-phase power source and/or the three-phase power source with aid of the bidirectional DC/AC module 50 and the bidirectional DC/DC module 30.

With the power system for the electric vehicle according to embodiments of the present disclosure, the electric vehicle can be charged with a high power by means of a civil or industrial AC grid, such that a user may perform the charge efficiently, promptly, anytime and anywhere, thus saving a charging time. Moreover, a constant-voltage control device or a constant-current control device is not required, thus saving a space and a cost and having a wide battery operation voltage range.

Figure 9:
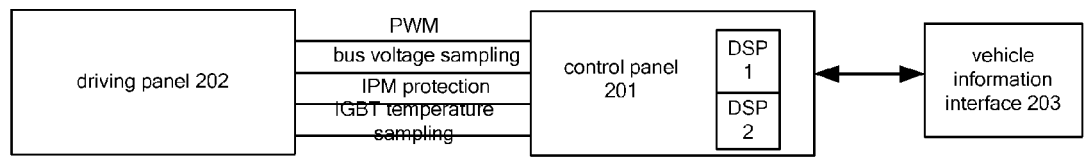
FIG. 9 is a block diagram of a controller module according to an embodiment of the present disclosure.

In one embodiment, as shown in FIG. 9, the controller module 80 includes a control panel 201 and a driving panel 202. A control module on the control panel 201 includes two high-speed digital signal processing chips (i.e., DSP1 and DSP2). The control module on the control panel 201 is connected and communicated with a vehicle information interface 203. The control module on the control panel 201 is configured to receive a bus voltage sampling signal, an IPM protection signal and an IGBT temperature sampling signal output from a driving module on the driving panel 202, and to output a pulse width modulation (PWM) signal to the driving module.

Figure 10:
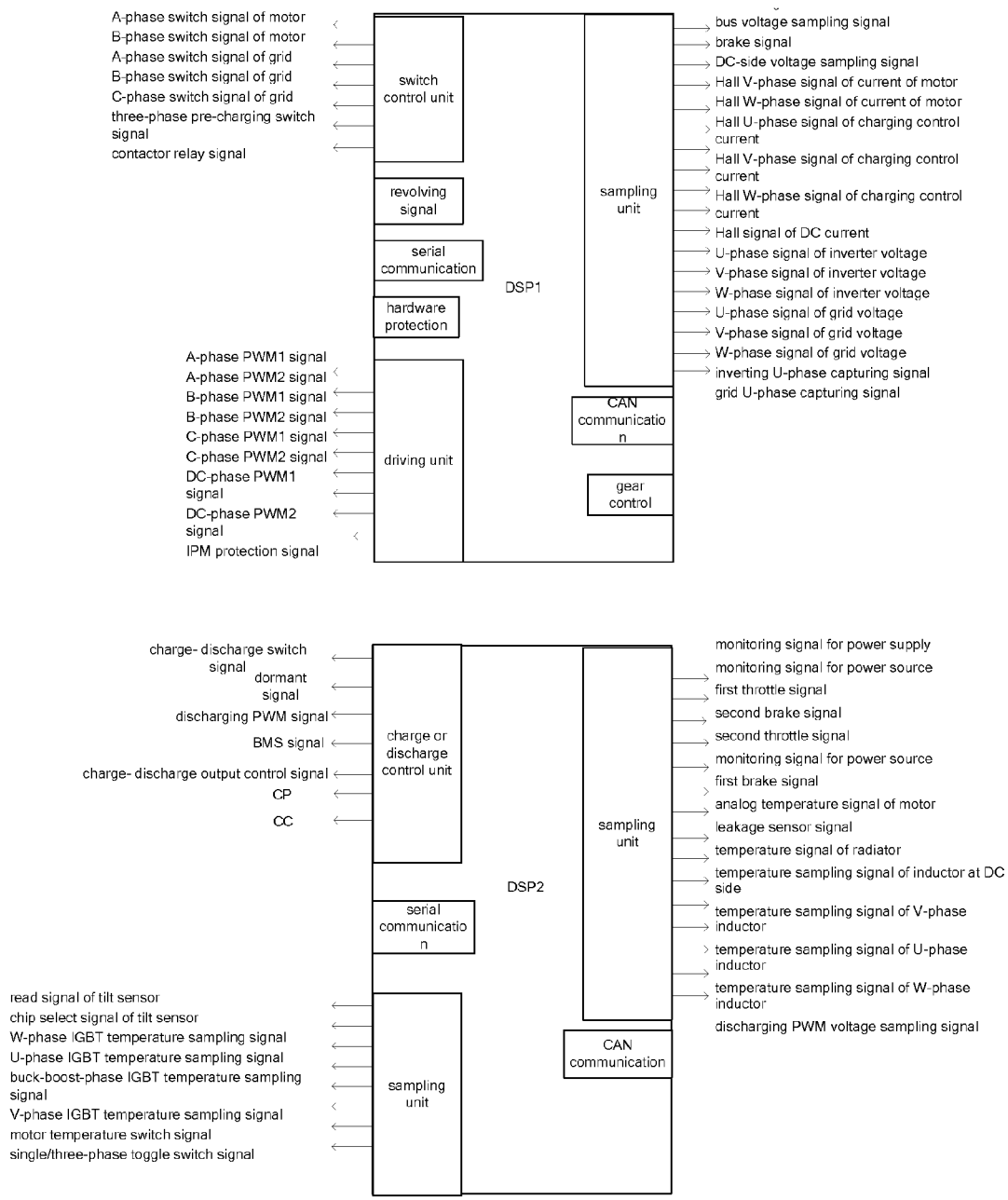
FIG. 10 is a schematic diagram showing interfaces of DSP (digital signal processing) chips in a controller module to be connected with a peripheral hardware circuit.

As shown in FIG. 10, the DSP1 is mainly configured to control and the DSP2 is configured to sample information. A sampling unit in the DSP1 outputs sampling signals including a throttle signal, a bus voltage sampling signal, a brake signal, a DC-side voltage sampling signal, a Hall V-phase signal of a current of the motor M, a Hall W-phase signal of the current of the motor M, a Hall U-phase signal of a charging control current, a Hall V-phase signal of the charging control current, a Hall W-phase signal of the charging control current, a Hall signal of a DC current, a U-phase signal of an inverter voltage, a V-phase signal of the inverter voltage, a W-phase signal of the inverter voltage, a U-phase signal of a grid voltage, a V-phase signal of the grid voltage, a W-phase signal of the grid voltage, an inverting U-phase capturing signal, a grid U-phase capturing signal, etc. A switch control unit in the DSP1 outputs an A-phase switch signal of the motor, a B-phase switch signal of the motor, an A-phase switch signal of the grid, a B-phase switch signal of the grid, a C-phase switch signal of the grid, a three-phase pre-charging switch signal, a contactor relay signal, etc. A driving unit in the DSP1 outputs an A-phase PWM1 signal, an A-phase PWM2 signal, a B-phase PWM1 signal, a B-phase PWM2 signal, a C-phase PWM1 signal, a C-phase PWM2 signal, a DC-phase PWM1 signal, a DC-phase PWM2 signal, an IPM protection signal, etc. In addition, the DSP1 also has other functions such as a revolving signal output control function, a serial communication function, a hardware protection function, a CAN communication function and a gear control function. A sampling unit in the DSP2 outputs a monitoring signal for a power supply, a monitoring signal for a power source, a first throttle signal, a second brake signal, a second throttle signal, a first brake signal, an analog temperature signal of the motor, a leakage sensor signal, a temperature signal of a radiator, a temperature sampling signal of an inductor at the DC side, a temperature sampling signal of a V-phase inductor, a temperature sampling signal of a U-phase inductor, a temperature sampling signal of a W-phase inductor, a discharging PWM voltage sampling signal, a read signal of a tilt sensor, a chip select signal of the tilt sensor, a W-phase IGBT temperature sampling signal, a U-phase IGBT temperature sampling signal, a buck-boost-phase IGBT temperature sampling signal, a V-phase IGBT temperature sampling signal, a motor temperature switch signal, a single/three-phase toggle switch signal, etc. A charge-discharge control unit in the DSP2 outputs a charge-discharge switch signal, a dormant signal, a discharging PWM signal, a BMS signal of a battery manager, a charge-discharge output control signal, a CP signal, a CC signal, etc. The DSP2 also has other functions such as a CAN communication function and a serial communication function.

Accordingly, the power system for the electric vehicle according to embodiments of the present disclosure combines a motor diving function, a vehicle control function, an AC charge function, a connected-grid power supplying function, an off-grid on-load function and a vehicle-to-vehicle charging function. Moreover, the power system does not combine various functional modules simply and physically, but based on a motor driving control system, makes use of some peripheral devices to implement the diversification of the functions of the system, thus saving space and cost to a maximum extent and improving a power density.

Specifically, functions of the power system for the electric vehicle are simply described below.

1. Motor Driving Function

A DC from the power battery 10 is inverted into an AC by means of the bidirectional DC/AC module 50, and the AC is transmitted to the motor M. The motor M can be controlled by a revolving transformer decoder technology and a space vector pulse width modulation (SVPWM) control algorithm.

Figure 11:
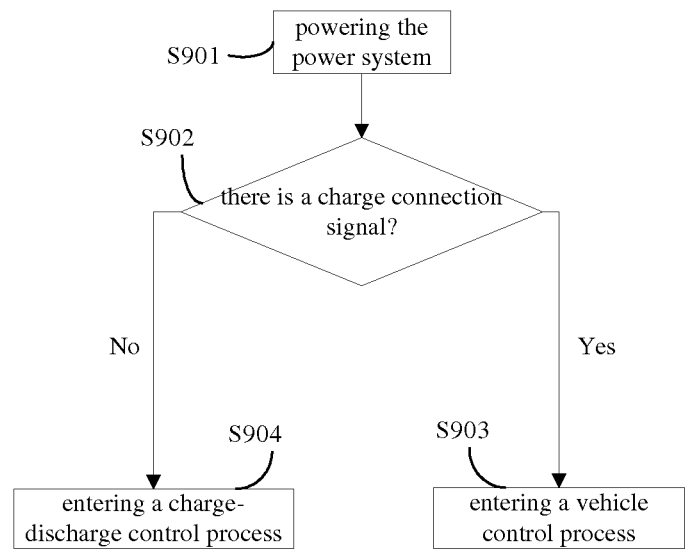
FIG. 11 is a flow chart of determining a function of a power system for an electric vehicle according to an embodiment of the present disclosure.

In other words, when the power system is powered to operate, as shown in FIG. 11, a process of determining a function of the power system comprises the following steps.

At step 901, the power system is powered.

At step 902, it is determined whether there is a charge connection signal.

If there is the charge connection signal, step 903 is executed; otherwise, step 904 is executed.

At step 903, the power system enters a charge-discharge control process. In one embodiment, a throttle signal, a gear signal and a brake signal are also determined. When the throttle is zero, and the electric vehicle is in N gear, and the electric vehicle is braked by a handbrake, and the charge connection signal (i.e. a CC signal) is effective (i.e. the charge-discharge socket 20 is connected with a charge connection device), the power system enters the charge-discharge control process.

At step 904, the power system enters a vehicle control process.

After the power system enters the vehicle control process at step 904, the controller module 80 controls the motor control switch 60 to turn on, and informs the battery manager 108 via a CAN communication to control the high-voltage distribution box 90 to pre-charge the first capacitor C1 and the bus capacitor C0, and then the controller module 80 detects a bus voltage 187 and determines whether the pre-charge is successful. If the pre-charge is successful, the controller module 80 informs the battery manager 108 to control the driving control switch 40 to turn on, such that the power system enters the driving mode; and the controller module 80 samples the vehicle information and drives the motor M via a comprehensive judgment process.

Figure 12:
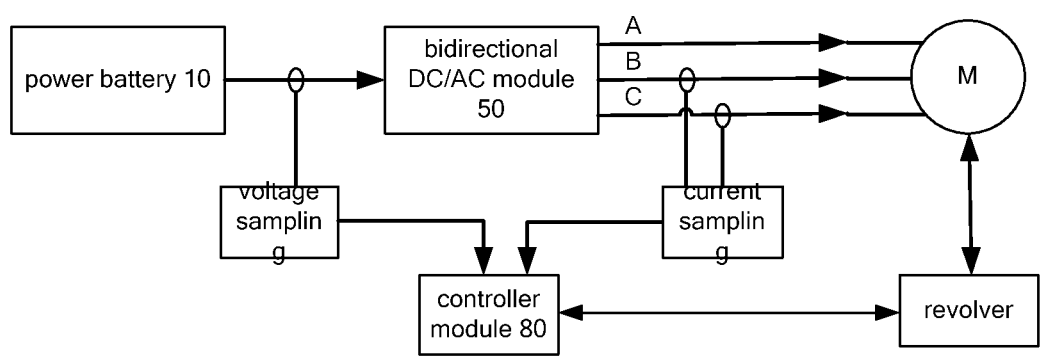
FIG. 12 is a block diagram of performing a motor driving control function by a power system for an electric vehicle according to an embodiment of the present disclosure.

The motor driving control function is performed as follows. As shown in FIG. 12, the controller module 80 sends a PWM signal so as to control the bidirectional DC/AC module 50 to invert the DC from the power battery 10 into the AC and transmit the AC to the motor M. Subsequently, the controller module 80 solves a rotor location via a revolver and samples the bus voltage and B-phase and C-phase currents of the motor so as to make the motor M operate precisely. In other words, the controller module 80 adjusts the PWM signal according to the B-phase and C-phase current signals of the motor sampled by a current sensor and feedback information from the revolver, such that the motor M may operate precisely.

Thus, by sampling the throttle, brake and gear information of the whole vehicle by a communication module and determining a current operation state of the vehicle, an accelerating function, a decelerating function and an energy feedback function can be implemented, such that the whole vehicle can operates safely and reliably under any condition, thus ensuring the safety, dynamic performance and comfort of the vehicle.

Figure 13:
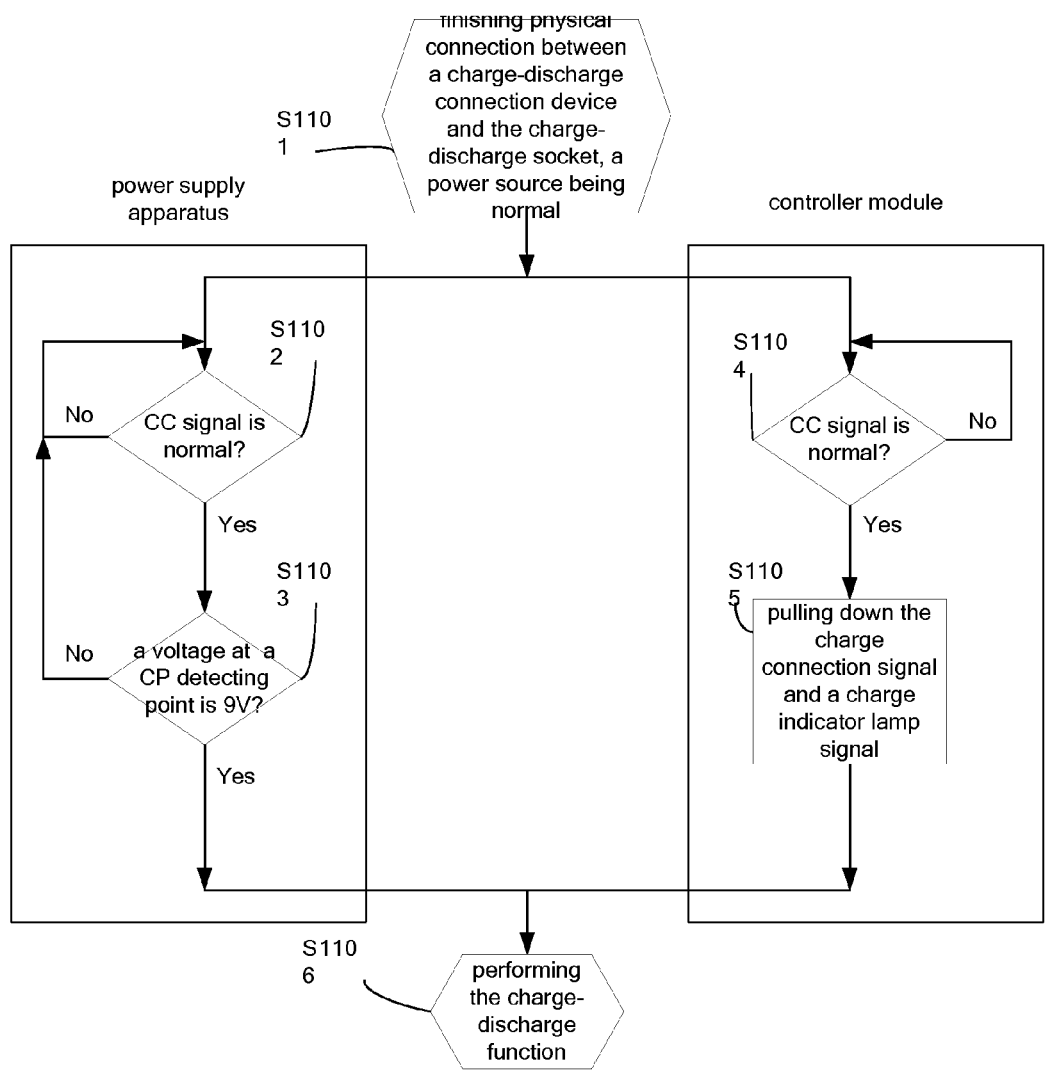
FIG. 13 is a flow chart of determining whether to start a charge-discharge function by a power system for an electric vehicle according to an embodiment of the present disclosure.

2. Charge-Discharge Function (1) Connection Confirmation and Start of Charge-discharge Function As shown in FIG. 13, a process of determining whether to start the charge-discharge function of the power system comprises the following steps.

At step 1101, the physical connection between the charge-discharge connection device and the charge-discharge socket is finished, and a power source is normal.

At step 1102, a power supply apparatus determines whether the charge connection signal (i.e. the CC signal) is normal, if yes, step 1103 is executed; if no, step 1102 is re-executed for another determining.

At step 1103, the power supply apparatus determines whether a voltage at a CP detecting point is 9V. If yes, step 1106 is executed; if no, step 1102 is re-executed for another determining. 9V is a predetermined value and is just exemplary.

At step 1104, the controller module determines whether the charge connection signal (i.e. the CC signal) is normal. If yes, step 1105 is executed; if no, step 1104 is re-executed for another determining.

At step 1105, the charge connection signal and a charge indicator lamp signal are pulled down.

At step 1106, the power system enters the charge-discharge function.

Figure 14:
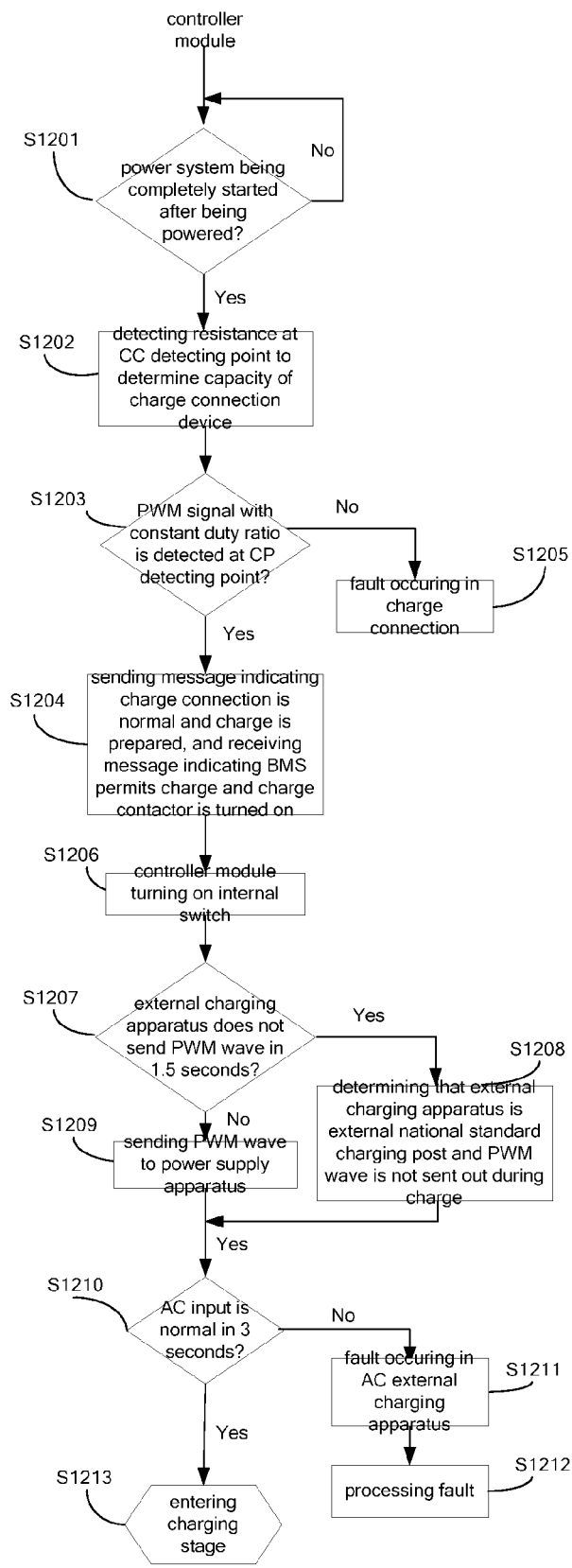
FIG. 14 is a flow chart of controlling a power system for an electric vehicle according to an embodiment of the present disclosure in a charging operation mode.

As shown in FIG. 14, a process of controlling the power system in a charging mode comprises following steps.

At step 1201, it is determined whether the power system is completely started after being powered. If yes, step 1202 is executed; if no, step 1201 is re-executed for another determining.

At step 1202, a resistance at a CC (charge connection) detecting point is detected, so as to determine a capacity of the charge connection device.

At step 1203, it is determined whether a PWM signal with a constant duty ratio is detected at the CP detecting point. If yes, step 1204 is executed; if no, step 1205 is executed.

At step 1204, a message indicating the charge connection is normal and the charge is prepared is sent out and a message indicating BMS permits the charge and a charge contactor is turned on is received, and step 1206 is executed.

At step 1205, a fault occurs in the charge connection.

At step 1206, the controller module turns on an internal switch.

At step 1207, it is determined whether an external charging apparatus does not send a PWM wave in a predetermined time such as 1.5 seconds. If yes, step 1208 is executed; if no, step 1209 is executed.

At step 1208, it is determined that the external charging apparatus is an external national standard charging post and the PWM wave is not sent out during the charge.

At step 1209, the PWM wave is sent to the power supply apparatus.

At step 1210, it is determined whether an AC input is normal in a predetermined time such as 3 seconds. If yes, step 1213 is executed; if no, step 1211 is executed.

At step 1211, a fault occurs in an AC external charging apparatus.

At step 1212, the fault is processed.

At step 1213, the power system enters the charging stage.

In other words, as shown in FIGS. 13-14, after the power supply apparatus and the controller module 80 detect themselves and no fault occurs therein, the capacity of the charge connection device may be determined by detecting a voltage of the CC signal, and it is determined whether the charge-discharge connection device is connected totally by detecting the CP signal. After it is determined that the charge-discharge connection device is connected totally, the message indicating the charge connection is normal and the charge is prepared is sent out, and the battery manager 108 controls the high-voltage distribution box 90 to turn on the first switch K1 so as to pre-charge the first capacitor C1 and the bus capacitor C0. After the pre-charge, the first switch K1 is turned off and the second switch K2 is turned on. The controller module 80 receives the message indicating BMS permits the charge and the second switch K2 is turned on, and thus the charge-discharge is prepared, i.e., functions such as the AC charge function (G to V, grid to vehicle), the off-grid on-load function (V to L, vehicle to load), the grid connection function (V to G, vehicle to grid) and the vehicle-to-vehicle charging function (V to V, vehicle to vehicle), may be set via the dashboard.

(2) AC Charge Function (G to V)

When the power system receives a charging instruction from the dashboard, the controller module 80 determines a minimum charging current among a maximum charging current allowed by the battery manager 80, a maximum power supply current of the power supply apparatus and a rated current of the charge-discharge connection device (i.e. the charge-discharge socket 20), and selects relevant charging parameters automatically. Moreover, the power system samples the AC transmitted by the power supply apparatus via a grid voltage sampling 183, so as to obtain a sampling value. The controller module 80 solves an effective value of an AC voltage according to the sampling value and determines an AC frequency by capturing. A type of the AC can be determined according to the effective value of the AC voltage and the AC frequency, and control parameters can be selected according to the type of the AC. After the control parameters are determined, the controller module 80 controls the three-phase pre-charging switch K9 in the second pre-charging module 106 and the contactor K10 in the filtering control module 104 to turn on, so as to charge the bus capacitor C0 at a PWM DC side. The controller module 80 samples the bus voltage 187, i.e. the voltage across the bus capacitor C0. When the bus voltage reaches a predetermined control parameter, for example, the bus voltage is a predetermined multiple of the voltage of the power battery 10, the controller module 80 controls the three-phase switch K8 to turn on and the three-phase switch K9 to turn off. According to selected parameters, the controller module 80 sends the PWM signal to control the bidirectional DC/AC module 50 to rectify an AC to obtain a DC. Then, the controller module 80 controls the bidirectional DC/DC module 30 to adjust the voltage of the DC according to the voltage of the power battery 10, and finally the DC is transmitted to the power battery 10. During the above process, the controller module 80 performs a closed-loop current control on the power system according to the determined target charging current and phase currents fed back from a current sampling 184, and finally the in-vehicle power battery 10 is charged. Thus, by detecting a charge connection signal, a type of an AC grid and relevant information on whole vehicle battery management, a controllable rectification function may be performed with aid of the bidirectional DC/AC module 50, and the in-vehicle power battery 10 may be charged by the single-phase power source and/or the three-phase power source with aid of the bidirectional DC/DC module 30 and the bidirectional DC/AC module 50.

(3) Off-grid On-load Function (V to L)

When the power system receives a V to L instruction from the dashboard, it is first determined whether a state of charge (SOC) of the power battery 10 is in an allowable discharging range. If yes, a type of an output voltage is selected according to the V to L instruction. A maximum output power is selected intelligently and controls parameters are given according to the rated current of the charge-discharge connection device, and then the power system enters a control process. First, the controller module 80 controls the three-phase switch K8 and the contactor K10 to turn on and sends the PWM signal to control the bidirectional DC/DC module 30 to adjust the voltage of the DC according to the voltage of the power battery and a given output voltage. After the voltage adjusted by the bidirectional DC/DC module 30 reaches a target value, the DC is transmitted to the bidirectional DC/AC module 50 to be inverted into the AC, and electric apparatuses may be powered by the AC directly via a dedicated charge socket. During the above process, the controller module 80 performs the adjustment according to a feedback of the voltage sampling 183, so as to ensure safe and reliable operation of a load.

In other words, after the power system is powered, when the V to L instruction from the dashboard and a required type of an output voltage are received, the charge connection signal and relevant information on whole vehicle battery management are detected, the DC/DC voltage conversion is performed according to the voltage of the power battery, and the DC is inverted into the AC by means of the bidirectional DC/AC module 50, thus outputting a stable single-phase/three-phase AC voltage.

(4) Connected-grid Power Supplying Function (V to G)

When the power system receives a V to G instruction from the dashboard, it is first determined whether the state of charge (SOC) of the power battery 10 is in the allowable discharging range. If yes, a type of an output voltage is selected according to the V to G instruction. A maximum output power is selected intelligently and controls parameters are given according to the rated current of the charge-discharge connection device, and the power system enters a control process. First, the controller module 80 controls the three-phase switch K8 and the contactor K10 to turn on and sends the PWM signal to control the bidirectional DC/DC module 30 to adjust the voltage of the DC according to the voltage of the power battery and the given output voltage. Then, the DC is transmitted to the bidirectional DC/AC module 50 to be inverted into the AC. During the above process, the controller module 80 performs the closed-loop current control on the power system according to a predetermined target discharging current and the phase currents fed back from the current sampling 184, so as to implement the grid connection power supplying.

In other words, after the power system is powered, when the V to G instruction from the dashboard is received, the charge connection signal, the type of the AC grid and relevant information on whole vehicle battery management are detected, the DC/DC voltage conversion is performed according to the voltage of the power battery, and the DC is inverted into the AC by means of the bidirectional DC/AC module 50, and thus the vehicle supplies the single-phase/three-phase AC to the grid.

(5) Vehicle-to-vehicle Charging Function (V to V)

The V to V function requires a dedicated connection plug. When the power system determines that the charge connection signal (i.e. CC signal) is effective and the connection plug is a dedicated charge plug for the V to V function by detecting a level of the connection plug, the power system is prepared for an instruction from the dashboard. For example, assuming vehicle A charges vehicle B, the vehicle A is set in a discharging state, i.e. the vehicle A is set to perform the off-grid on-load function, the vehicle B is set in an AC charging state. The controller module in vehicle A sends the message indicating "the charge connection is normal" and "the charge is prepared" to the battery manager. The battery manager controls a charge-discharge circuit to perform the pre-charging, and sends the message indicating the charge is permitted and the charging contactor is turned on to the controller module after the pre-charging is finished. Then, the power system performs the discharging function and sends the PWM signal. After the vehicle B receives the charging instruction, the power system therein detects a CP signal which determines that the vehicle A is prepared to supply power, and the controller module 80 sends a normal connection message to the battery manager. After receiving the message, the battery manager 108 finishes the pre-charging process and informs the controller module that the whole power system is prepared for the charge. Then, the vehicle-to-vehicle charging function (V to V) starts, and thus vehicles can charge each other.

In other words, after the power system is powered, when the V to V instruction from the dashboard is received, the charge connection signal and relevant information on whole vehicle battery management are detected, and the vehicle is set in an AC power output state and sends the CP signal by simulating a charging box, so as to communicate with the vehicle to be charged. With the vehicle, the DC/DC voltage conversion is performed according to the voltage of the power battery, and the DC is inverted into the AC by means of the bidirectional DC/AC module 50, and thus the vehicle can charge another vehicle with the single-phase/three-phase AC.

Figure 15:
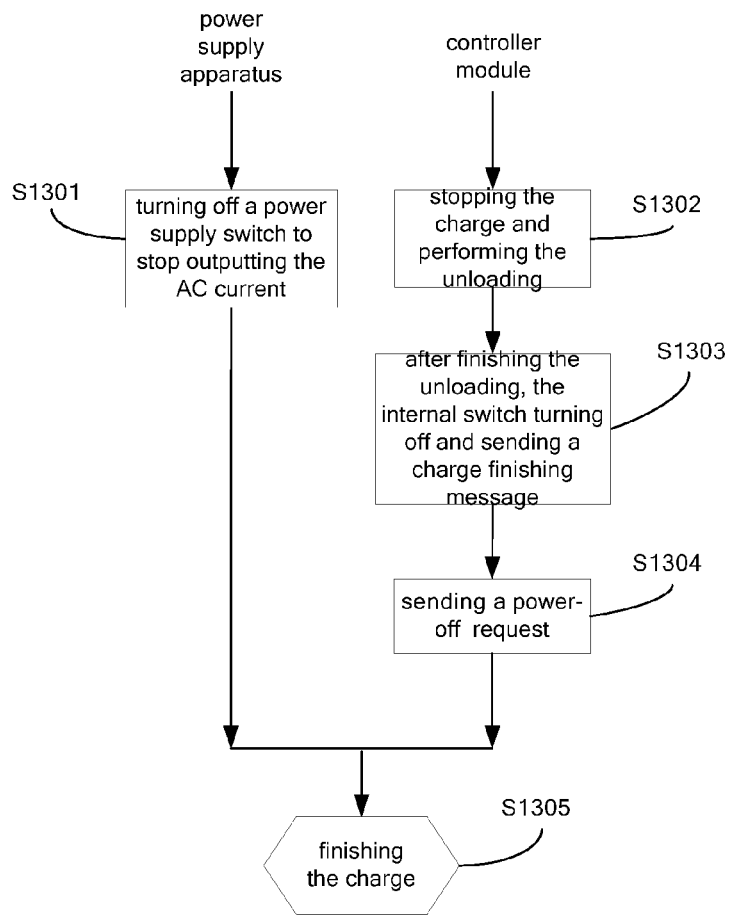
FIG. 15 is a flow chart of controlling a power system for an electric vehicle according to an embodiment of the present disclosure when the charging of the electric vehicle is finished.

In one embodiment, as shown in FIG. 15, a process of controlling the power system when the charging of the electric vehicle is finished comprises the following steps.

At step 1301, the power supply apparatus turns off a power supply switch to stop outputting the AC, and step 1305 is executed.

At step 1302, the controller module stops the charge and performs the unloading, and step 1303 is executed.

At step 1303, after the unloading is finished, the internal switch is turned off and a charge finishing message is sent out.

At step 1304, a power-off request is sent out.

At step 1305, the charge is finished.

Figure 16:
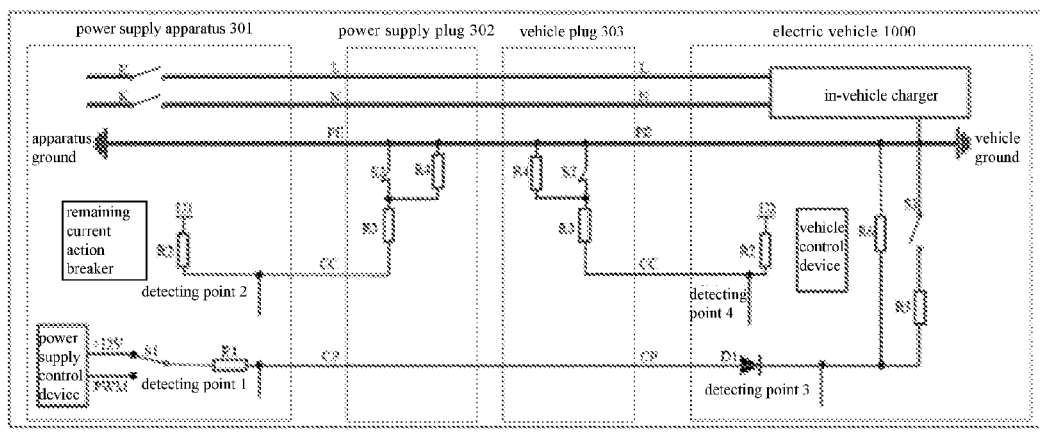
FIG. 16 is a circuit diagram showing the connection between a power supply apparatus and an electric vehicle according to an embodiment of the present disclosure.

As shown in FIG. 16, a power supply apparatus 301 is connected with a vehicle plug 303 of an electric vehicle 1000 via a power supply plug 302, so as to charge the electric vehicle 1000. The power system of the electric vehicle 1000 detects a CP signal at a detecting point 3 and detects a CC signal at a detecting point 4, and the power supply apparatus 301 detects the CP signal at a detecting point 1 and detects the CC signal at a detecting point 2. After the charge is finished, the internal switches S2 in both the power supply plug 302 and the vehicle plug 303 are controlled to turn off.

In another embodiment, a plurality of power systems connected in parallel can be used in the electric vehicle to charge the power battery. For example, two power systems connected in parallel are used to charge the power battery, and the two power systems use a common controller module.

Figure 17:
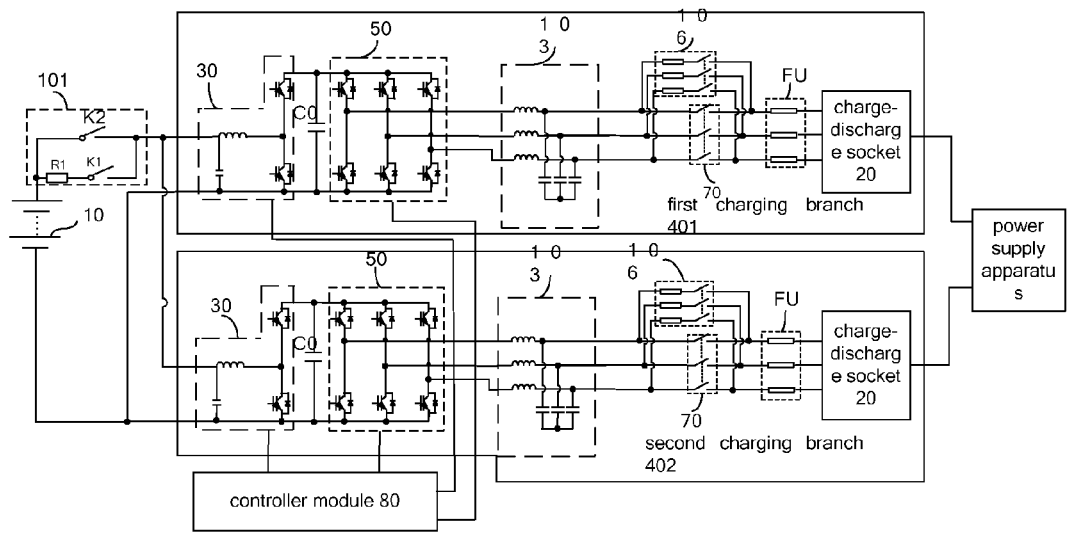
FIG. 17 is a schematic diagram of charging an electric vehicle using two power systems connected in parallel according to an embodiment of the present disclosure.

In this embodiment, as shown in FIG. 17, a charging system for the electric vehicle comprises a power battery 10, a first charging branch 401, a second charging branch 402 and a controller module 80. Each of the first charging branch 401 and the second charging branch 402 comprises a charge-discharge socket 20, a bidirectional DC/DC module 30, a bus capacitor C0, a bidirectional DC/AC module 50, a filtering module 103, a charge-discharge control module 70 and a second pre-charging module 106. Moreover, each of the first charging branch 401 and the second charging branch 402 further includes a fuse FU. The power battery 10 is connected with the first charging branch 401 via the first pre-charging control module 101, and connected with the second charging branch 402 via the first pre-charging control module 101. The controller module 80 is connected with the first charging branch 401 and the second charging branch 402 respectively, and configured to control the grid to charge the power battery 10 via the first charging branch 401 and the second charging branch 402 respectively when receiving a charging signal.

In addition, an embodiment of the present disclosure provides a method for controlling charging an electric vehicle. The method comprises following steps.

At step 1, when determining that a first charging branch is connected with a power supply apparatus via a charge-discharge socket and a second charging branch is connected with the power supply apparatus via the charge-discharge socket, a controller module sends a charge connection signal to a battery manager.

At step 2, after receiving the charge connection signal sent from the controller module, the battery manager detects and determines whether a power battery needs to be charged, if yes, a next step (step 3) is executed.

At step 3, the battery manager sends a charging signal to the controller module.

At step 4, after receiving the charging signal, the controller module controls the grid to charge the power battery via the first charging branch and the second charging branch respectively.

With the charging system for the electric vehicle and the method for controlling charging the electric vehicle according to the above embodiments of the present disclosure, the controller module controls the grid to charge the power battery via the first charging branch and the second charging branch respectively, such that a charging power of the electric vehicle is increased and a charging time is shortened greatly, thus implementing a fast charge and saving a time cost.

In some embodiments, the power system for the electric vehicle has a wide compatibility and performs a single-phase/three-phase switching function, and thus is adapted to various power grids of different countries.

Figure 18:
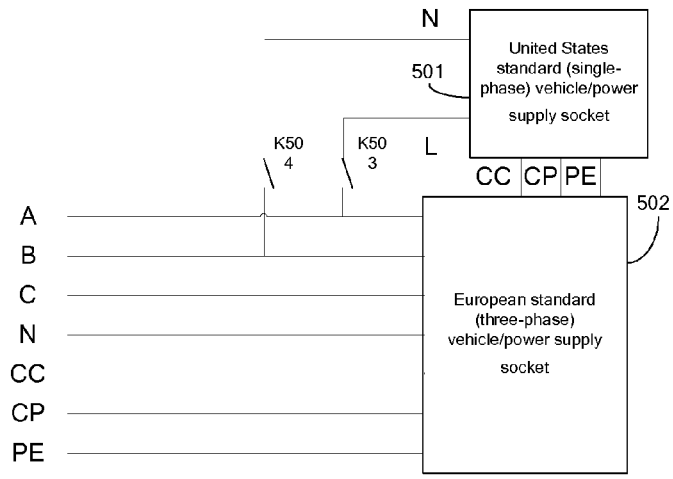
FIG. 18 is a schematic diagram of a charge-discharge socket according to an embodiment of the present disclosure.

Specifically, as shown in FIG. 18, the charge-discharge socket 20 has a function of switching between two charging sockets (such as a United States standard charging socket and a European standard charging socket). The charge-discharge socket 20 includes a single-phase charging socket 501 such as the United States standard charging socket, a three-phase charging socket 502 such as the European standard charging socket and two high-voltage contactors K503 and K504. A CC terminal, a CP terminal and a CE terminal are common terminals for the single-phase charging socket 501 and the three-phase charging socket 502. The single-phase charging socket 501 has an L-phase wire and an N-phase wire connected with an A-phase wire and a B-phase wire of the three-phase charging socket 502 via the contactors K503 and K504 respectively. When receiving a single-phase charge-discharge instruction, the controller module 80 controls the contactors K503 and K504 to turn on, such that the A-phase and B-phase wires of the three-phase charging socket 502 are connected with the L-phase and N-phase wires of the single-phase charging socket 501 respectively. The three-phase charging socket 502 does not operate, and instead of the L-phase and N-phase wires of the single-phase charging socket 501, the A-phase and B-phase wires of the three-phase charging socket 502 are connected with the charge plug, and thus the controller module 80 can perform the single-phase charge function normally.

Alternatively, a standard 7-core socket is used and the single-phase switch K7 is added between the N-phase and B-phase wires. When receiving the single-phase charge-discharge instruction, the controller module 80 controls the single-phase switch K7 to turn on so as to connect the B-phase wire with the N-phase wire. Then, the A-phase and B-phase wires are used as the L-phase and N-phase wires respectively, and the connection plug should be a dedicated connection plug or a connection plug whose B-phase and C-phase wires are not used.

In other words, in some embodiments, the power system detects a voltage of the grid via the controller module 80 and determines the frequency and the single-phase/three-phase of the grid by calculation, so as to obtain the type of the grid. Then, the controller module 80 selects different control parameters according to a type of the charge-discharge socket 20 and the type of the grid. Furthermore, the controller module 80 controls the bidirectional DC/AC module 50 to rectify the AC controllably to obtain the DC and controls the bidirectional DC/DC module 30 to adjust the voltage of the DC according to the voltage of the power battery. Finally, the DC is transmitted to the power battery 10.

Figure 19:
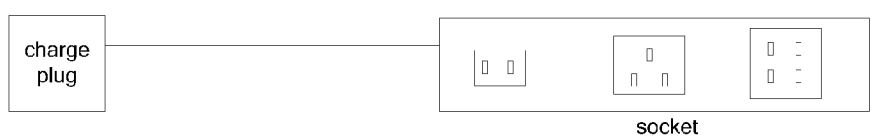
FIG. 19 is a schematic diagram of an off-grid on-load discharge plug according to an embodiment of the present disclosure.

In another embodiment, as shown in FIG. 19, an off-grid on-load charging socket includes two-core, three-core and four-core sockets connected with a charge plug, and is configured to output single-phase, three-phase and four-phase current.

With the integrated control system for the electric vehicle according to embodiments of the present disclosure, a unified switching between respective operation modes of the system can be implemented according to practical requirements of different operation modes, thus implementing a coordination control to separated systems in the vehicle and having a high compatibility. Moreover, by providing a cooling system, a heat dissipation requirement can be satisfied when the system works at high power, thus satisfying different function requirements, expanding requirement of the electric vehicle, and having a good adaptability. The system implements the compatibility for the driving, charging and discharging requirements and satisfies the requirement of high power output.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An integrated control system for an electric vehicle, comprising:
   a power battery;
   a high-voltage distribution box connected with the power battery;
   an integrated driving and charge-discharge controller, connected with the power battery via the high-voltage distribution box, and connected with a motor and a charge-discharge socket respectively, and configured to drive the motor when the electric vehicle is in a driving mode and to control to charge and discharge the power battery via the charge-discharge socket when the electric vehicle is in a charge-discharge mode;
   an auxiliary high-voltage element connected with the power battery via the high-voltage distribution box;
   a first DC/DC module connected with the power battery via the high-voltage distribution box; and
   a controller connected with the high-voltage distribution box and configured to control the high-voltage distribution box so as to perform a pre-charging via the high-voltage distribution box before the integrated driving and charge-discharge controller, the auxiliary high-voltage element and the first DC/DC module are powered on,
   wherein the high-voltage distribution box comprises:
   a first pre-charging control module and a first switch connected in parallel with the first pre-charging control module, wherein the first pre-charging control module has a first terminal connected with a first terminal of the power battery and a second terminal connected with a first terminal of the integrated driving and charged-discharged controller, and the first switch has a first terminal connected with the first terminal of the power battery and a second terminal connected with the first terminal of the integrated driving and charge-discharge controller;

a second pre-charging control module and a second switch connected in parallel with the second pre-charging control module, wherein the second pre-charging control module has a first terminal connected with the first terminal of the power battery and a second terminal connected with a first terminal of the first DC/DC module, and the second switch has a first terminal connected with the first terminal of the power battery and a second terminal connected with the first terminal of the first DC/DC module;

a third pre-charging control module and a third switch connected in parallel with the third pre-charging control module, wherein the third pre-charging control module has a first terminal connected with the first terminal of the power battery and a second terminal connected with a first terminal of the auxiliary high-voltage element, and the third switch has a first terminal connected with the first terminal of the power battery and a second terminal connected with the first terminal of the auxiliary high-voltage element;

a fourth switch having a first terminal connected with the first terminal of the power battery and a second terminal connected with a second terminal of the integrated driving and charge-discharge controller; and a fifth switch having a first terminal connected with a second terminal of the power battery and a second terminal connected with a third terminal of the integrated driving and charge-discharge controller, a second terminal of the first DC/DC module and a second terminal of the auxiliary high-voltage element respectively.

2. The integrated control system according to claim 1, wherein when the electric vehicle is in the driving mode or the charge-discharge mode, the controller controls to pre-charge the integrated driving and charge-discharge controller via the first pre-charging control module and turns on the fourth switch, and controls the first pre-charging control module to turn off and turns on the first switch when a bus voltage of the integrated driving and charge-discharge controller is a predetermined multiple of a voltage of the power battery.

3. The integrated control system according to claim 2, wherein after the first switch is turned on, the controller further controls to pre-charge the auxiliary high-voltage element via the third pre-charging control module; and when the bus voltage of the auxiliary high-voltage element is a predetermined multiple of the voltage of the power battery, the controller controls the third pre-charging control module to turn off and turns on the third switch.

4. The integrated control system according to claim 3, wherein when the electric vehicle is in the driving mode and the third switch is turned on, the controller further controls to pre-charge the first DC/DC module via the second pre-charging control module; and when a bus voltage of the first DC/DC module is a predetermined multiple of the voltage of the battery, the controller controls the second pre-charging control module to turn off and turns on the second switch.

5. The integrated control system according to claim 1, further comprising:

a cooling module configured to cool the integrated control system.

6. The integrated control system according to claim 1, wherein the integrated driving and charge-discharge controller comprises:

a bidirectional DC/DC module having a first DC terminal connected with the second terminal of the fourth switch and a second DC terminal connected with second terminals of the first pre-charging control module and the first switch respectively, wherein the first DC terminal is a common DC terminal for an input to and an output from the bidirectional DC/DC module;

a driving control switch having a first terminal connected with the second terminal of the power battery and a second terminal connected with a third DC terminal of the bidirectional DC/DC module;

a bidirectional DC/AC module having a first DC terminal connected with the second terminal of the driving control switch and a second DC terminal connected with the second terminal of the power battery;

a motor control switch having a first terminal connected with an AC terminal of the bidirectional DC/AC module and a second terminal connected with the motor;

a charge-discharge control module having a first terminal connected with the AC terminal of the bidirectional DC/AC module and a second terminal connected with the charge-discharge socket; and a controller module connected with the driving control switch, the motor control switch and the charge-discharge control module respectively, and configured to control the driving control switch, the motor control switch and the charge-discharge control module according to a current operation mode of a power system of the electric vehicle.

7. The integrated control system according to claim 6, wherein when the current operation mode of the power system is the driving mode, the controller module controls the fifth switch to turn on to stop the bidirectional DC/DC module, controls the motor control switch to turn on, and controls the charge-discharge control module to turn off.

8. The integrated control system according to claim 7, wherein when the current operation mode of the power system is the charge-discharge mode, the controller module controls the fifth switch to turn off to start the bidirectional DC/DC module, controls the motor control switch to turn off, and controls the charge-discharge control module to turn on.

9. The integrated control system according to claim 6, wherein the bidirectional DC/DC module comprises:

a first switching transistor and a second switching transistor connected in series, connected between the first DC terminal and the third DC terminal of the bidirectional DC/DC module, and controlled by the controller module, in which a first node is defined between the first switching transistor and the second switching transistor;

a first diode connected with the first switching transistor in inverse-parallel;

a second diode connected with the second switching transistor in inverse-parallel;

a first inductor having a first terminal connected with the first node and a second terminal connected with the second terminal of the power battery; and a first capacitor having a first terminal connected with the second terminal of the first inductor and a second terminal connected with the first terminal of the power battery.

10. The integrated control system according to claim 6, wherein the integrated driving and charge-discharge controller further comprises:
   a leakage current reducing module connected between the first DC terminal and the third DC terminal of the bidirectional DC/DC module.

11. The integrated control system according to claim 10, wherein the leakage current reducing module comprises:
   a second capacitor and a third capacitor, in which the second capacitor has a first terminal connected with a first terminal of the third capacitor and a second terminal connected with the first DC terminal of the bidirectional DC/DC module, the third capacitor has a second terminal connected with the third DC terminal of the bidirectional DC/DC module, and a second node is defined between the second capacitor and the third capacitor.

12. The integrated control system according to claim 11, wherein the integrated driving and charge-discharge controller further comprises:
   a filtering module connected between the bidirectional DC/AC module and the charge-discharge control module.

13. The integrated control system according to claim 12, wherein the integrated driving and charge-discharge controller further comprises:
   a filtering control module connected between the second node and the filtering module, controlled by the controller module, and configured to control the filtering control module to turn off when the current operation mode of the power system is the driving mode.

14. The integrated control system according to claim 12, further comprising:
   a second pre-charging control module connected with the charge-discharge control module in parallel and configured to control to pre-charge a capacitor in the filtering module.

15. The integrated control system according to claim 6, wherein the charge-discharge control module comprises:
   a three-phase switch and/or a single-phase switch configured to implement a three-phase charge-discharge or a single-phase charge-discharge.

16. An electric vehicle comprising an integrated control system, wherein the integrated control system comprises:
   a power battery;
   a high-voltage distribution box connected with the power battery;
   an integrated driving and charge-discharge controller connected with the power battery via the high-voltage distribution box, connected with a motor and a charge-discharge socket respectively, and configured to drive the motor when the electric vehicle is in a driving mode and to control to charge and discharge the power battery via the charge-discharge socket when the electric vehicle is in a charge-discharge mode;
   an auxiliary high-voltage element connected with the power battery via the high-voltage distribution box;
   a first DC/DC module connected with the power battery via the high-voltage distribution box; and
   a controller connected with the high-voltage distribution box and configured to control the high-voltage distribution box so as to perform a pre-charging via the high-voltage distribution box before the integrated driving and charge-discharge controller, the auxiliary high-voltage element and the first DC/DC module are powered on,
   wherein the high-voltage distribution box comprises:
   a first pre-charging control module and a first switch connected in parallel with the first pre-charging control module, wherein the first pre-charging control module has a first terminal connected with a first terminal of the power battery and a second terminal connected with a first terminal of the integrated driving and charge-discharge controller, and the first switch has a first terminal connected with the first terminal of the power battery and a second terminal connected with the first terminal of the integrated driving and charge-discharge controller;
   a second pre-charging control module and a second switch connected in parallel with the second pre-charging control module, wherein the second pre-charging control module has a first terminal connected with the first terminal of the power battery and a second terminal connected with a first terminal of the first DC/DC module, and the second switch has a first terminal connected with the first terminal of the power battery and a second terminal connected with the first terminal of the first DC/DC module;
   a third pre-charging control module and a third switch connected in parallel with the third pre-charging control module, wherein the third pre-charging control module has a first terminal connected with the first terminal of the power battery and a second terminal connected with a first terminal of the auxiliary high-voltage element, and the third switch has a first terminal connected with the first terminal of the power battery and a second terminal connected with the first terminal of the auxiliary high-voltage element;
   a fourth switch having a first terminal connected with the first terminal of the power battery and a second terminal connected with a second terminal of the integrated driving and charge-discharge controller; and
   a fifth switch having a first terminal connected with a second terminal of the power battery and a second terminal connected with a third terminal of the integrated driving and charge-discharge controller, a second terminal of the first DC/DC module and a second terminal of the auxiliary high-voltage element respectively.

* * * * *

UNITED STATES PATENT AND TRADEMARK OFFICE
CERTIFICATE OF CORRECTION

PATENT NO.         : 9,493,088 B2
APPLICATION NO.    : 14/370041
DATED              : November 15, 2016
INVENTOR(S)        : Wei Wei et al.

Page 1 of 1

It is certified that error appears in the above-identified patent and that said Letters Patent is hereby corrected as shown below:

In the Claims

Column 23, Lines 2:3, please delete "charged-discharged" before "controller," and replace with -- charge-discharge --

Signed and Sealed this
Twenty-fifth Day of April, 2017

Michelle K. Lee
*Director of the United States Patent and Trademark Office*